US012355049B2

United States Patent
Li et al.

(10) Patent No.: US 12,355,049 B2
(45) Date of Patent: Jul. 8, 2025

(54) SELF-HEATING BIPOLAR SOLID-STATE BATTERY

(71) Applicant: GM GLOBAL TECHNOLOGY OPERATIONS LLC, Detroit, MI (US)

(72) Inventors: Zhe Li, Shanghai (CN); Xiaochao Que, Shanghai (CN); Haijing Liu, Shanghai (CN); Yong Lu, Shanghai (CN); Meiyuan Wu, Shanghai (CN); Jingyuan Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 682 days.

(21) Appl. No.: 17/683,976

(22) Filed: Mar. 1, 2022

(65) Prior Publication Data
US 2022/0302526 A1   Sep. 22, 2022

(30) Foreign Application Priority Data
Mar. 19, 2021   (CN) ........................ 202110295505.5

(51) Int. Cl.
*H01M 10/6571*   (2014.01)
*H01M 4/02*   (2006.01)
(Continued)

(52) U.S. Cl.
CPC ....... *H01M 10/6571* (2015.04); *H01M 4/661* (2013.01); *H01M 4/663* (2013.01);
(Continued)

(58) Field of Classification Search
CPC ........... H01M 10/6571; H01M 10/615; H01M 10/0525; H01M 10/0585; H01M 4/661;
(Continued)

(56) References Cited

U.S. PATENT DOCUMENTS 9,548,497 B2 *   1/2017   Ravdel
11,145,922 B2   10/2021   Li et al.
(Continued)

FOREIGN PATENT DOCUMENTS

CN   104916848 A   9/2015
CN   107431237 A   12/2017
(Continued)

OTHER PUBLICATIONS

Kato, Yuki et al.; "High-power all-solid-state batteries using sulfide superionic conductors"; Nature Energy; vol. 1; Article No. 16030; DOI 10.1038; Mar. 21, 2016; 7 pages.
(Continued)

*Primary Examiner* — Niki Bakhtiari
*Assistant Examiner* — Lilian Alice Odom
(74) *Attorney, Agent, or Firm* — Harness, Dickey & Pierce, P.L.C.

(57) ABSTRACT

The present disclosure provides a solid-state battery including at least one current collector that is in communication with one or more switches configured to move between open and closed positions, where the open position corresponds to a first operational state of the solid-state battery and the closed position corresponds to a second operational state of the solid-state battery; one or more electrodes disposed adjacent to the one or more current collectors; and one or more electrothermal material foils including a resistor material that is in electrical communication with that at least one current collector, where in the first operational state electrons may flow through the one or more electrothermal material foils during cycling of the solid-state battery so as to initiate a heating mode, and in the second operational state electrons may flow through the current collector during cycling of the solid-state battery so as to initiate a non-heating mode.

19 Claims, 12 Drawing Sheets

(51) Int. Cl.
  *H01M 4/66* (2006.01)
  *H01M 4/80* (2006.01)
  *H01M 10/0525* (2010.01)
  *H01M 10/0585* (2010.01)
  *H01M 10/615* (2014.01)

(52) U.S. Cl.
  CPC ....... *H01M 4/808* (2013.01); *H01M 10/0525* (2013.01); *H01M 10/0585* (2013.01); *H01M 10/615* (2015.04); *H01M 2004/021* (2013.01)

(58) Field of Classification Search
  CPC ........... H01M 4/663; H01M 2004/021; H01M 4/808
  See application file for complete search history.

(56) References Cited

U.S. PATENT DOCUMENTS

| | | | |
|---|---|---|---|
| 11,205,798 B2 | 12/2021 | Li et al. | |
| 11,411,261 B2 | 8/2022 | Yu et al. | |
| 2014/0211370 A1* | 7/2014 | Seymour et al. | |
| 2015/0295245 A1* | 10/2015 | Christensen et al. | |
| 2016/0156081 A1 | 6/2016 | Wang et al. | |
| 2017/0098856 A1* | 4/2017 | Zhamu et al. | |
| 2018/0138513 A1 | 5/2018 | Dai et al. | |
| 2018/0309163 A1* | 10/2018 | Kim et al. | |
| 2020/0036070 A1* | 1/2020 | Li et al. | |
| 2020/0119357 A1 | 4/2020 | Hou et al. | |
| 2020/0403267 A1 | 12/2020 | Li et al. | |
| 2021/0020929 A1 | 1/2021 | Kong et al. | |
| 2021/0028481 A1 | 1/2021 | Hou et al. | |
| 2021/0036310 A1 | 2/2021 | Hou et al. | |
| 2021/0036360 A1 | 2/2021 | Li et al. | |
| 2021/0036373 A1 | 2/2021 | Li et al. | |
| 2021/0050157 A1 | 2/2021 | Hou et al. | |
| 2021/0050596 A1 | 2/2021 | Li et al. | |
| 2021/0057776 A1 | 2/2021 | Lu et al. | |
| 2021/0066746 A1 | 3/2021 | Hou et al. | |
| 2021/0111426 A1 | 4/2021 | Li et al. | |
| 2021/0135224 A1 | 5/2021 | Hou et al. | |
| 2022/0102756 A1 | 3/2022 | Frieberg et al. | |
| 2022/0123352 A1 | 4/2022 | Li et al. | |
| 2022/0140422 A1 | 5/2022 | Chen et al. | |
| 2022/0166031 A1 | 5/2022 | Li et al. | |
| 2022/0181598 A1 | 6/2022 | Lu et al. | |
| 2022/0181685 A1 | 6/2022 | Li et al. | |
| 2022/0263055 A1 | 8/2022 | Hou et al. | |
| 2022/0263129 A1 | 8/2022 | Lu et al. | |

FOREIGN PATENT DOCUMENTS

| | | |
|---|---|---|
| CN | 109830754 A | 5/2019 |
| CN | 110402519 A | 11/2019 |
| CN | 110783619 A | 2/2020 |
| CN | 110783665 A | 2/2020 |
| CN | 112310465 A | 2/2021 |
| CN | 115117293 A | 9/2022 |
| DE | 102021131339 A1 | 9/2022 |

OTHER PUBLICATIONS

Nam, Young Jin et al.; "Toward practical all-solid-state lithium-ion batteries with high energy density and safety: Comparative study for electrodes fabricated by dry-and slurry-mixing processes"; Journal of Power Sources 375; Nov. 23, 2017; pp. 93-101.

First Office Action for German Patent Application No. 10 2021 131 339.2 issued on Mar. 2, 2023, with correspondence from Manitz Finsterwald Patent-und Rechtsanwaltspartnerschaft mbB summarizing Office Action; 7 pages.

First Office Action for Chinese Patent Application No. 202110295505.5 issued Mar. 5, 2025, with correspondence from China Patent Agent (H.K.) Ltd summarizing Office Action; 11 pages.

* cited by examiner

SELF-HEATING BIPOLAR SOLID-STATE BATTERY

CROSS-REFERENCE TO RELATED APPLICATIONS

This application claims the benefit and priority of Chinese Application No. 202110295505.5, filed Mar. 19, 2021. The entire disclosure of the above application is incorporated herein by reference.

INTRODUCTION

This section provides background information related to the present disclosure which is not necessarily prior art.

Electrochemical energy storage devices, such as lithium-ion batteries, can be used in a variety of products, including automotive products such as start-stop systems (e.g., 12V start-stop systems), battery-assisted systems ("uBAS"), Hybrid Electric Vehicles ("HEVs"), and Electric Vehicles ("EVs"). Typical lithium-ion batteries include two electrodes and an electrolyte component and/or separator. One of the two electrodes can serve as a positive electrode or cathode, and the other electrode can serve as a negative electrode or anode. Lithium-ion batteries may also include various terminal and packaging materials. Rechargeable lithium-ion batteries operate by reversibly passing lithium ions back and forth between the negative electrode and the positive electrode. For example, lithium ions may move from the positive electrode to the negative electrode during charging of the battery and in the opposite direction when discharging the battery. A separator and/or electrolyte may be disposed between the negative and positive electrodes. The electrolyte is suitable for conducting lithium ions between the electrodes and, like the two electrodes, may be in a solid form, a liquid form, or a solid-liquid hybrid form. In the instances of solid-state batteries, which include a solid-state electrolyte layer disposed between solid-state electrodes, the solid-state electrolyte physically separates the solid-state electrodes so that a distinct separator is not required.

Solid-state batteries have advantages over batteries that include a separator and a liquid electrolyte. These advantages can include a lower self-discharge, simpler thermal management, a reduced need for packaging, and the ability to operate within a wider temperature window. For example, solid-state electrolytes are generally non-volatile and non-flammable allowing cells to be cycled under harsher conditions without experiencing diminished potential or thermal runaway, which can potentially occur with the use of liquid electrolytes. However, solid-state batteries generally experience comparatively low power capabilities. For example, such low power capabilities may be a result of interfacial resistance caused by limited contact, or void spaces, between the solid-state active particles and/or the solid-state electrolyte particles. Accordingly, it would be desirable to develop high-performance solid-state battery designs, materials, and methods that improve power capabilities, as well as energy density.

SUMMARY

This section provides a general summary of the disclosure, and is not a comprehensive disclosure of its full scope or all of its features.

The present disclosure relates to solid-state batteries (SSBs), for example bipolar solid-state batteries, that include one or more electrothermal material foils and a metal foam material, for example as a current collector. Each bipolar solid-state battery includes a plurality of solid-state electroactive material particles and a plurality of solid-state electrolyte particles embedded within pores of a metal foam and one or more current collector foils disposed on or adjacent to one or more surfaces of the metal foam material. The one or more electrothermal material foils may be configured to heat the solid-state battery during cycling.

In various aspects, the present disclosure provides a solid-state battery that is configured to cycle lithium ions. The solid-state battery may include one or more current collectors, where at least one of the one or more current collectors may be in communication with one or more switches that are configured to move between an open position and a closed position, and where the open position corresponds to a first operational state of the solid-state battery and the closed position corresponds to a second operational state of the solid-state battery; one or more electrodes disposed adjacent to the one or more current collectors, where each electrode may have a thickness greater than or equal to about 100 μm to less than or equal to about 3,000 μm and may include a plurality of solid-state electroactive material particles; and one or more electrothermal material foils including a resistor material that is in electrical communication with at least one of the one or more current collectors, where in the first operational state electrons may flow through the one or more electrothermal material foils during cycling of the solid-state battery so as to initiate a heating mode, and in the second operational state electrons may flow through the one or more current collectors during cycling of the solid-state battery so as to initiate a non-heating mode.

In one aspect, each of the one or more electrothermal material foils may have a thickness greater than or equal to about 5 μm to less than or equal to about 200 μm.

In one aspect, the resistor material may be selected from the group consisting of: nickel, stainless steel, copper, constantan, chromium, aluminum, iron, titanium, graphite, and alloys and combinations thereof.

In one aspect, at least one of the one or more electrothermal material foils may be patterned. The pattern may include a plurality of void areas.

In one aspect, the plurality of solid-state electroactive material particles may be disposed on or embedded in a porous material.

In one aspect, the porous material may have a porosity greater than or equal to about 80 vol. % to less than or equal to about 95 vol. %.

In one aspect, the porous material may have an average pore size greater than or equal to about 2 μm to less than or equal to about 1000 μm.

In one aspect, the porous material may have a thickness greater than or equal to about 100 μm to less than or equal to about 4000 μm.

In one aspect, the porous material may be a metal foam. The metal foam may be selected from an aluminum (Al) foam, a nickel (Ni) foam, a copper (Cu) foam, a nickel-chromium (Ni—Cr) foam, a nickel-tin (Ni—Sn) foam, and a titanium (Ti) foam.

In one aspect, the porous material may be one of a carbon nanofiber three-dimensional foam, a graphene foam, a carbon cloth, a carbon fiber-embedded carbon nanotubes, and a graphene-nickel foam.

In one aspect, the one or more electrodes may include a first electrode and a second electrode. The first electrode may include a first plurality of solid-state electroactive material particles, and the second electrode may include a second plurality of solid-state electroactive material particles.

In one aspect, the one or more current collectors may include a first current collector. The first plurality of solid-state electroactive material particles may be disposed adjacent to a first surface of the first current collector. The second plurality of solid-state electroactive material particles may be disposed adjacent to a second surface of the first current collector that opposes the first surface.

In one aspect, the first current collector may include a first film and a second film. The second film may be parallel with the first film. The first film may define the first surface of the first current collector, and the second film may define the second surface of the first current collector.

In one aspect, the first film may have a thickness less than or equal to about 10 µm, and the second film may have a thickness less than or equal to about 10 µm.

In one aspect, the first electrode may further include a plurality of solid-state electrolyte particles. The plurality of solid-state electrolyte particles may be mixed with the first plurality of solid-state electroactive material particles and also disposed on the porous material.

In one aspect, the first plurality of solid-state electroactive material particles may be disposed on a first section of the porous material, and the second plurality of solid-state electroactive material particles may be disposed on a second section of the porous material.

In one aspect, the plurality of solid-state electrolyte particles mixed with the first plurality of solid-state electroactive material particles may be a first plurality of solid-state electrolyte particles, and the second electrode may further include a second plurality of solid-state electrolyte particles. The second plurality of solid-state electrolyte particles may be mixed with the second plurality of solid-state electroactive material particles and also disposed on the porous material.

In one aspect, the first current collector may be a film disposed on a third portion of the porous material that is formed between the first and second portions of the porous material.

In one aspect, the one or more current collectors may include a first current collector and a second current collector. The second current collector may be parallel with the first current collector. The one or more electrodes may include a first electrode and a second electrode. The first electrode may include a first plurality of solid-state electroactive material particles disposed adjacent to the first current collector. The second electrode may include a second plurality of solid-state electroactive material particles disposed adjacent to the second current collector. The solid-state battery may further include a solid-state electrolyte layer that is disposed between the first electrode and the second electrode. The solid-state electrolyte layer may include a plurality of solid-state electrolyte particles.

In one aspect, the solid-state electrolyte layer may have a thickness greater than or equal to about 5 µm to less than or equal to about 100 µm.

In one aspect, the solid-state electrolyte layer may include a first sublayer and a second sublayer. The first sublayer may include a first plurality of solid-state electrolyte particles. The second sublayer may include a second plurality of solid-state electrolyte particles. The first and second pluralities of solid-state electrolyte particles may be the same or different.

In various aspects, the present disclosure provides a solid-state battery that is configured to cycle lithium ion. The solid-state battery may include a first current collector; a first electrode having a thickness greater than or equal to about 100 µm to less than or equal to about 3,000 µm disposed adjacent to the first current collector; a second current collector parallel with the first current collector, where at least one of the first and second current collectors is in communication with one or more switches that are configured to move the solid-state battery between an open position and a closed position, and where the open position corresponds to a first operational state of the solid-state battery and the closed position corresponds to a second operational state of the solid-state battery; a second electrode having a thickness greater than or equal to about 100 µm to less than or equal to about 3,000 µm disposed adjacent to the second current collector; a solid-state electrolyte layer disposed between the first electrode and the second electrode; and one or more electrothermal material foils having a thickness greater than or equal to about 5 µm to less than or equal to about 200 µm and including a resistor material in electrical communication with at least one of the first and second current collectors, where in the first operational state electrons may flow through the one or more electrothermal material foils during cycling of the solid-state battery so as to initiate a heating mode, and in the second operational state electrons may flow through at least one of the first and second current collectors during cycling of the solid-state battery so as to initiate a non-heating mode. The first electrode may include a first plurality of solid-state electroactive material particles disposed on or embedded in a first porous material. The second electrode may include a second plurality of solid-state electroactive material particles disposed on or embedded in a second porous material.

In one aspect, the first and second porous materials may each have a porosity greater than or equal to about 80 vol. % to less than or equal to about 95 vol. %.

In one aspect, the first and second porous materials may each have an average pore size of greater than or equal to about 2 µm to less than or equal to about 1000 µm.

In one aspect, the first and second porous materials may each have a thickness greater than or equal to about 100 µm to less than or equal to about 4000 µm.

In one aspect, the resistor material may be selected from the group consisting of: nickel, stainless steel, copper, constantan, chromium, aluminum, iron, titanium, graphite, and alloys and combinations thereof.

In one aspect, at least one of the one or more electrothermal material foils may be patterned. The pattern may include a plurality of void areas.

In one aspect, at least one of the first and second current collectors may include a first film and a second film. The second film may be parallel with the first film. The first and second films may each have a thickness less than about 10 µm.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
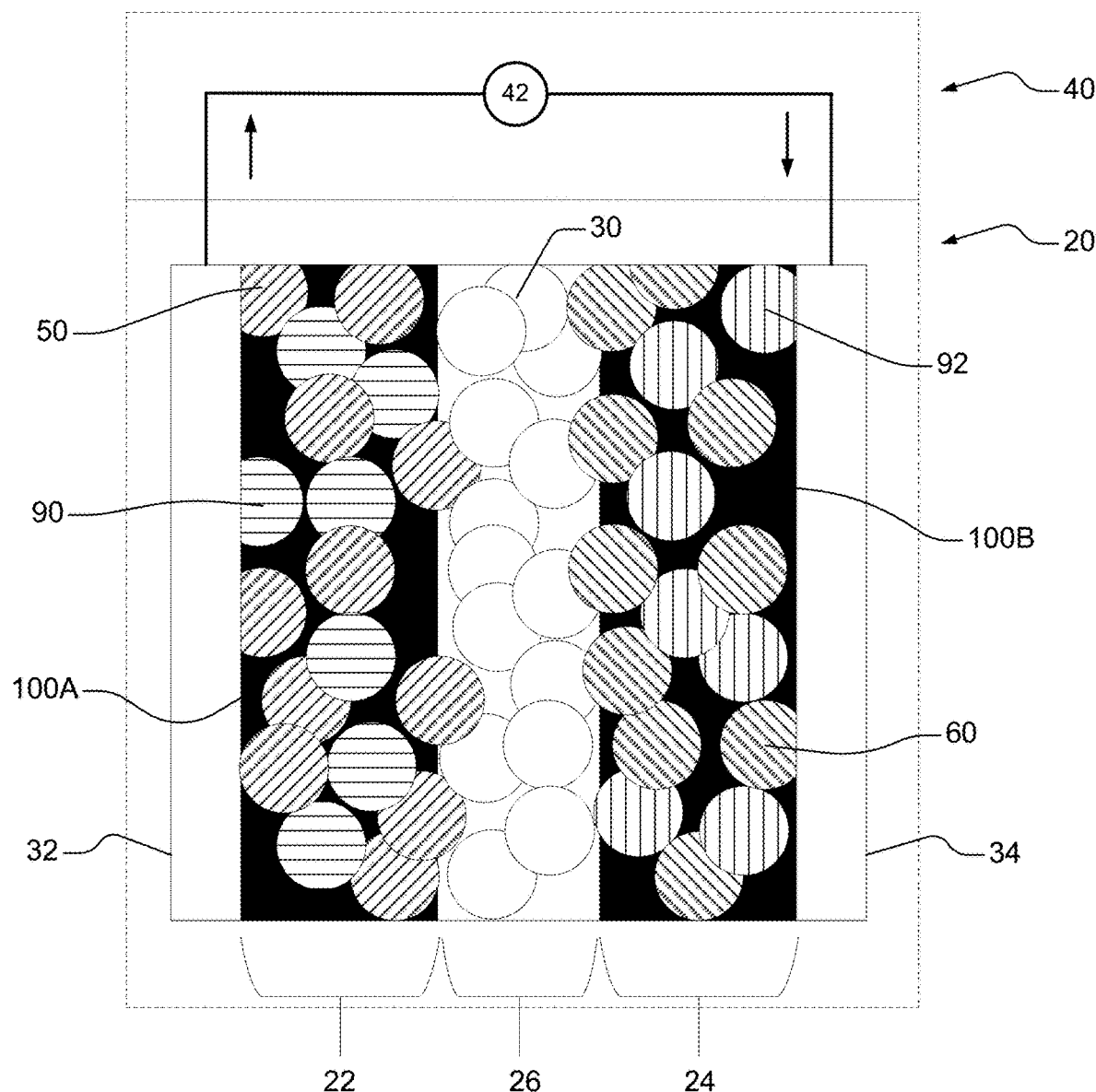
FIG. 1 is an illustration of an example solid-state battery including a metal foam in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower,"

"above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The current technology pertains to solid-state batteries (SSBs), for example only, bipolar solid-state batteries, including a metal foam material (for example, as a current collector) and an electrothermal material foil (for example, as a self-heating element), and methods for forming and using solid-state batteries including metal foam materials and electrothermal material foils.

Solid-state batteries may include at least one solid component, for example, at least one solid electrode, but may also include semi-solid or gel, liquid, or gas components, in certain variations. Solid-state batteries may have a bipolar stacking design comprising a plurality of bipolar electrodes where a first mixture of solid-state electroactive material particles (and optional solid-state electrolyte particles) is disposed on or within a metal foam material on a first side of a current collector film, and a second mixture of solid-state electroactive material particles (and optional solid-state electrolyte particles) is disposed on or within a metal foam material on a second side of the current collector film that is parallel with the first side. The first mixture may include, as the solid-state electroactive material particles, cathode material particles. The second mixture may include, as solid-state electroactive material particles, anode material particles. The solid-state electrolyte particles in each instance may be the same or different. A solid-state electrolyte layer including a plurality of solid-state electrolyte particles may be disposed between the electrodes of adjacent cells. The electrothermal material foils may be disposed between adjacent current collector films and/or at terminal ends of the battery pack.

Such solid-state batteries may be incorporated into energy storage devices, like rechargeable lithium-ion batteries, which may be used in automotive transportation applications (e.g., motorcycles, boats, tractors, buses, mobile homes, campers, and tanks). The present technology, however, may also be used in other electrochemical devices, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. In various aspects, the present disclosure provides a rechargeable lithium-ion battery that exhibits high temperature tolerance, as well as improved safety and good power capability and life performance.

An exemplary and schematic illustration of an all-solid-state electrochemical cell unit (also referred to as "solid-state battery" and/or "battery") 20 that cycles lithium ions is shown in FIG. 1. The battery 20 includes a negative electrode (i.e., anode) 22, a positive electrode (i.e., cathode) 24, and a solid state electrolyte layer 26. The solid-state electrolyte layer 26 is a separating layer that physically separates the negative electrode 22 and the positive electrode 24. The solid-state electrolyte layer 26 may be defined by a first plurality of solid-state electrolyte particles 30. A second plurality of solid-state electrolyte particles 90 may be mixed with negative solid-state electroactive particles 50 in the negative electrode 22, and a third plurality of solid-state electrolyte particles 92 may be mixed with positive solid-state electroactive particles 60 in the positive electrode 24, so as to form a continuous electrolyte network, which may be a continuous lithium-ion conduction network. The negative solid-state electroactive particles 50 and the second plurality of solid-state electrolyte particles 90 may be disposed on or embedded within a porous material 100A. The positive solid-state electroactive particles 60 and the third plurality of solid-state electrolyte particles 92 may be disposed on or embedded within a porous material 100B.

A negative electrode current collector foil 32 may be positioned at or near the negative electrode 22. For example, the negative electrode current collector foil 32 may be disposed on a top surface of a porous material 100A. The porous material 100A may provide support for the negative electrode current collector foil 32 such that the negative current collector foil 32 may have a thickness greater than or equal to about 2 μm to less than or equal to about 30 μm, and in certain aspects, optionally greater than or equal to about 2 μm to less than or equal to about 10 μm. The negative electrode current collector foil 32 may be formed from copper or any other appropriate electrically conductive material known to those of skill in the art.

A positive electrode current collector foil 34 may be positioned at or near the positive electrode 24. For example, the positive electrode current collector foil 34 may be disposed on a top surface of a porous material 100B. The porous material 100B may provide support for the positive electrode current collector foil 34 such that the positive current collector foil 34 may have a thickness greater than or equal to about 2 μm to less than or equal to about 30 μm, and in certain aspects, optionally greater than or equal to about 2 μm to less than or equal to about 10 μm. The positive electrode current collector foil 34 may be formed from aluminum or any other electrically conductive material known to those of skill in the art.

The negative electrode current collector foil 32 and the positive electrode current collector foil 34 respectively collect and move free electrons to and from an external circuit 40 (as shown by the block arrows). For example, an interruptible external circuit 40 and a load device 42 may connect the negative electrode 22 (through the negative electrode current collector foil 32) and the positive electrode 24 (through the positive electrode current collector foil 34). The battery 20 can generate an electric current (indicated by arrows in FIG. 1) during discharge by way of reversible electrochemical reactions that occur when the external circuit 40 is closed (to connect the negative electrode 22 and the positive electrode 24) and when the negative electrode 22 has a lower potential than the positive electrode 24. The chemical potential difference between the negative electrode 22 and the positive electrode 24 drives electrons produced by a reaction, for example, the oxidation of intercalated lithium, at the negative electrode 22, through the external circuit 40 towards the positive electrode 24. Lithium ions, which are also produced at the negative electrode 22, are concurrently transferred through the solid-state electrolyte layer 26 towards the positive electrode 24. The electrons flow through the external circuit 40 and the lithium ions migrate across the solid-state electrolyte layer 26 to the positive electrode 24, where they may be plated, reacted, or intercalated. The electric current passing through the external circuit 40 can be harnessed and directed through the load device 42 (in the direction of the arrows) until the lithium in the negative electrode 22 is depleted and the capacity of the battery 20 is diminished.

The battery 20 can be charged or reenergized at any time by connecting an external power source (e.g., charging device) to the battery 20 to reverse the electrochemical reactions that occur during battery discharge. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator. The connection of the external power source to the battery 20 promotes a reaction, for example, non-spontaneous oxidation of intercalated lithium, at the positive electrode 24 so that electrons and lithium ions are produced. The electrons, which flow back towards the negative electrode 22 through the external circuit 40, and the lithium ions, which move across the solid-state electrolyte layer 26 back towards the negative electrode 22, reunite at the negative electrode 22 and replenish it with lithium for consumption during the next battery discharge cycle. As such, a complete discharging event followed by a complete charging event is considered to be a cycle, where lithium ions are cycled between the positive electrode 24 and the negative electrode 22.

Although the illustrated example includes a single positive electrode 24 and a single negative electrode 22, as illustrated in FIG. 1, the skilled artisan will recognize that the current discussion applies to various other configurations (such as illustrated in FIGS. 3, 8, and 10-12) including those having one or more cathodes and one or more anodes, as well as various current collectors and current collector films with electroactive particle layers disposed on or adjacent to or embedded within one or more surfaces thereof. Likewise, it should be recognized that the battery 20 may include a variety of other components that, while not depicted here, are nonetheless known to those of skill in the art. For example, the battery 20 may include a casing, a gasket, terminal caps, and any other conventional components or materials that may be situated within the battery 20, including between or around the negative electrode 22, the positive electrode 24, and/or the solid-state electrolyte 26 layer.

The size and shape of the battery 20 may vary depending on the particular applications for which it is designed. Battery-powered vehicles and hand-held consumer electronic devices are two examples where the battery 20 would most likely be designed to different size, capacity, voltage, energy, and power-output specifications. The battery 20 may also be connected in series or parallel with other similar lithium-ion cells or batteries to produce a greater voltage output, energy, and power if it is required by the load device 42. The battery 20 can generate an electric current to the load device 42 that can be operatively connected to the external circuit 40. The load device 42 may be fully or partially powered by the electric current passing through the external circuit 40 when the battery 20 is discharging. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be an electricity-generating apparatus that charges the battery 20 for purposes of storing electrical energy.

With renewed reference to FIG. 1, the solid-state electrolyte layer 26 provides electrical separation-preventing physical contact-between the negative electrode 22 and the positive electrode 24. The solid-state electrolyte layer 26 also provides a minimal resistance path for internal passage of ions. In various aspects, the solid-state electrolyte layer 26 may be defined by a first plurality of solid-state electrolyte particles 30. For example, the solid-state electrolyte layer 26 may be in the form of a layer or a composite that comprises the first plurality of solid-state electrolyte particles 30. The solid-state electrolyte particles 30 may have an average particle diameter greater than or equal to about 0.02 μm to less than or equal to about 20 μm, optionally greater than or equal to about 0.1 μm to less than or equal to about 10 μm, and in certain aspects, optionally greater than or equal to about 0.1 μm to less than or equal to about 1 μm. The solid-state electrolyte layer 26 may be in the form of a layer having a thickness greater than or equal to about 5 μm to less than or equal to about 200 μm, optionally greater than or equal to about 10 μm to less than or equal to about 100 μm, optionally about 40 μm, and in certain aspects, optionally about 30 μm.

The solid-state electrolyte particles 30 may comprise one or more sulfide-based particles, oxide-based particles, metal-doped or aliovalent-substituted oxide particles, nitride-based particles, hydride-based particles, halide-based particles, and borate-based particles.

In certain variations, the oxide-based particles may comprise one or more garnet ceramics, LISICON-type oxides, NASICON-type oxides, and Perovskite type ceramics. For example, the garnet ceramics may be selected from the group consisting of: $Li_7La_3Zr_2O_{12}$, $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, and combinations thereof. The LISICON-type oxides may be selected from the group consisting of: $Li_{2+2x}Zn_{1-x}GeO_4$ (where 0<x<1), $Li_{14}Zn(GeO_4)_4$, $Li_{3+x}(P_{1-x}Si_x)O_4$ (where 0<x<1), $Li_{3+x}Ge_xV_{1-x}O_4$ (where 0<x<1), and combinations thereof. The NASICON-type oxides may be defined by $LiMM'(PO_4)_3$, where M and M' are independently selected from Al, Ge, Ti, Sn, Hf, Zr, and La. For example, in certain variations, the NASICON-type oxides may be selected from the group consisting of: $Li_{1+x}Al_xGe_{2-x}(PO_4)_3$ (LAGP) (where 0≤x≤2), $Li_{1.4}Al_{0.4}Ti_{1.6}(PO_4)_3$, $Li_{1.3}Al_{0.3}Ti_{1.7}(PO_4)_3$, $LiTi_2(PO_4)_3$, LiGeTi(PO$_4$)$_3$, LiGe$_2$(PO$_4$)$_3$, LiHf$_2$(PO$_4$)$_3$, and combinations thereof. The Perovskite-type ceramics may be selected from the group consisting of: Li$_{3.3}$La$_{0.53}$TiO$_3$, LiSr$_{1.65}$Zr$_{1.3}$Ta$_{1.7}$O$_9$, Li$_{2x-y}$Sr$_{1-x}$Ta$_y$Zr$_{1-y}$O$_3$ (where x=0.75y and 0.60<y<0.75), Li$_{3/8}$Sr$_{7/16}$Nb$_{3/4}$Zr$_{1/4}$O$_3$, Li$_{3x}$La$_{(2/3-x)}$TiO$_3$ (where 0<x<0.25), and combinations thereof.

In certain variations, the metal-doped or aliovalent-substituted oxide particles may include, for example only, aluminum (Al) or niobium (Nb) doped Li$_7$La$_3$Zr$_2$O$_{12}$, antimony (Sb) doped Li$_7$La$_3$Zr$_2$O$_{12}$, gallium (Ga) doped Li$_7$La$_3$Zr$_2$O$_{12}$, chromium (Cr) and/or vanadium (V) substituted LiSn$_2$P$_3$O$_{12}$, aluminum (Al) substituted Li$_{1+x+y}$Al$_x$Ti$_{2-x}$Si$_y$P$_{3-y}$O$_{12}$ (where 0<x<2 and 0<y<3), and combinations thereof.

In certain variations, the sulfide-based particles may include, for example only, a pseudobinary sulfide, a pseudoternary sulfide, and/or a pseudoquaternary sulfide. Example pseudobinary sulfide systems include Li$_2$S—P$_2$S$_5$ systems (such as, Li$_3$PS$_4$, Li$_7$P$_3$S$_{11}$, and Li$_{9.6}$P$_3$S$_{12}$), Li$_2$S—SnS$_2$ systems (such as, Li$_4$SnS$_4$), Li$_2$S—SiS$_2$ systems, Li$_2$S—GeS$_2$ systems, Li$_2$S—B$_2$S$_3$ systems, Li$_2$S—Ga$_2$S$_3$ system, Li$_2$S—P$_2$S$_3$ systems, and Li$_2$S—Al$_2$S$_3$ systems. Example pseudoternary sulfide systems include Li$_2$O—Li$_2$S—P$_2$S$_5$ systems, Li$_2$S—P$_2$S$_5$—P$_2$O$_5$ systems, Li$_2$S—P$_2$S$_5$—GeS$_2$ systems (such as, Li$_{3.25}$Ge$_{0.25}$P$_{0.75}$S$_4$ and Li$_{10}$GeP$_2$S$_{12}$), Li$_2$S—P$_2$S$_5$—LiX systems (where X is one of F, Cl, Br, and I) (such as, Li$_6$PS$_5$Br, Li$_6$PS$_5$Cl, Li$_7$P$_2$S$_8$I, and Li$_4$PS$_4$I), Li$_2$S—As$_2$S$_5$—SnS$_2$ systems (such as, Li$_{3.833}$Sn$_{0.833}$AS$_{0.166}$S$_4$), Li$_2$S—P$_2$S$_5$—Al$_2$S$_3$ systems, Li$_2$S—LiX—SiS$_2$ systems (where X is one of F, Cl, Br, and I), 0.4LiI·0.6Li$_4$SnS$_4$, and Li$_{11}$Si$_2$PS$_{12}$. Example pseudoquaternary sulfide systems include Li$_2$O—Li$_2$S—P$_2$S$_5$—P$_2$O$_5$ systems, Li$_{9.54}$Si$_{1.74}$P$_{1.44}$S$_{11.7}$Cl$_{0.3}$, Li$_7$P$_{2.9}$Mn$_{0.1}$S$_{10.7}$I$_{0.3}$, and Li$_{10.35}$[Sn$_{0.27}$Si$_{1.08}$]P$_{1.65}$S$_{12}$.

In certain variations, the nitride-based particles may include, for example only, Li$_3$N, Li$_7$PN$_4$, LiSi$_2$N$_3$, and combinations thereof; the hydride-based particles may include, for example only, LiBH$_4$, LiBH$_4$—LiX (where x=Cl, Br, or I), LiNH$_2$, Li$_2$NH, LiBH$_4$—LiNH$_2$, Li$_3$AlH$_6$, and combinations thereof; the halide-based particles may include, for example only, LiI, Li$_3$InCl$_6$, Li$_2$CdC$_{14}$, Li$_2$MgCl$_4$, LiCdI$_4$, Li$_2$ZnI$_4$, Li$_3$OCl, Li$_3$YCl$_6$, Li$_3$YBr$_6$, and combinations thereof; and the borate-based particles may include, for example only, Li$_2$B$_4$O$_7$, Li$_2$O—B$_2$O$_3$—P$_2$O$_5$, and combinations thereof.

In various aspects, the first plurality of solid-state electrolyte particles 30 may include one or more electrolyte materials selected from the group consisting of: Li$_2$S—P$_2$S$_5$ system, Li$_2$S—P$_2$S$_5$-MO$_x$ system (where 1<x<7), Li$_2$S—P$_2$S$_5$-MS$_x$ system (where 1<x<7), Li$_{10}$GeP$_2$S$_{12}$ (LGPS), Li$_6$PS$_5$X (where X is Cl, Br, or I) (lithium argyrodite), Li$_7$P$_2$S$_8$I, Li$_{10.35}$Ge$_{1.35}$P$_{1.65}$S$_{12}$, Li$_{3.25}$Ge$_{0.25}$P$_{0.75}$S$_4$ (thio-LISICON), Li$_{10}$SnP$_2$S$_{12}$, Li$_{9.54}$Si$_{1.74}$P$_{1.44}$S$_{11.7}$Cl$_{0.3}$, (1-x)P$_2$S$_5$-xLi$_2$S (where 0.5≤x≤0.7), Li$_{3.4}$Si$_{0.4}$P$_{0.6}$S$_4$, PLi$_{10}$GeP$_2$S$_{11.7}$O$_{0.3}$, Li$_{9.6}$P$_3$S$_{12}$, Li$_7$P$_3$S$_{11}$, Li$_9$P$_3$S$_9$O$_3$, Li$_{10.35}$Ge$_{1.35}$P$_{1.63}$S$_{12}$, Li$_{9.81}$Sn$_{0.81}$P$_{2.19}$S$_{12}$, Li$_{10}$ (Si$_{0.5}$Ge$_{0.5}$)P$_2$S$_{12}$, Li$_{10}$(Ge$_{0.5}$Sn$_{0.5}$)P$_2$S$_{12}$, Li$_{10}$ (Si$_{0.5}$Sn$_{0.5}$)P$_2$S$_{12}$, Li$_{3.833}$Sn$_{0.833}$As$_{0.16}$S$_4$, Li$_7$La$_3$Zr$_2$O$_{12}$, Li$_{6.2}$Ga$_{0.3}$La$_{2.95}$Rb$_{0.05}$Zr$_2$O$_{12}$, Li$_{6.85}$La$_{2.9}$Ca$_{0.1}$Zr$_{1.75}$Nb$_{0.25}$O$_{12}$, Li$_{6.25}$Al$_{0.25}$La$_3$Zr$_2$O$_{12}$, Li$_{6.75}$La$_3$Zr$_{1.75}$Nb$_{0.25}$O$_{12}$, Li$_{6.75}$La$_3$Zr$_{1.75}$Nb$_{0.25}$O$_{12}$, Li$_{2+2x}$Zn$_{1-x}$GeO$_4$ (where 0<x<1), Li$_{14}$Zn(GeO$_4$)$_4$, Li$_{3+x}$(P$_{1-x}$Si$_x$)O$_4$ (where 0<x<1), Li$_{3+x}$Ge$_x$V$_{1-x}$O$_4$ (where 0<x<1), LiMM'(PO$_4$)$_3$ (where M and M' are independently selected from Al, Ge, Ti, Sn, Hf, Zr, and La), Li$_{3.3}$La$_{0.53}$TiO$_3$, LiSr$_{1.65}$Zr$_{1.3}$Ta$_{1.7}$O$_9$, Li$_{2x-y}$Sr$_{1-x}$Ta$_y$Zr$_{1-y}$O$_3$ (where x=0.75y and 0.60<y<0.75), Li$_{3/8}$Sr$_{7/16}$Nb$_{3/4}$Zr$_{1/4}$O$_3$, Li$_{3x}$La$_{(2/3-x)}$TiO$_3$ (where 0<x<0.25), aluminum (Al) or niobium (Nb) doped Li$_7$La$_3$Zr$_2$O$_{12}$, antimony (Sb) doped Li$_7$La$_3$Zr$_2$O$_{12}$, gallium (Ga) doped Li$_7$La$_3$Zr$_2$O$_{12}$, chromium (Cr) and/or vanadium (V) substituted LiSn$_2$P$_3$O$_{12}$, aluminum (Al) substituted Li$_{1+x+y}$Al$_x$Ti$_{2-x}$Si$_y$P$_{3-y}$O$_{12}$ (where 0<x<2 and 0<y<3), LiI—Li$_4$SnS$_4$, Li$_4$SnS$_4$, Li$_3$N, Li—PN$_4$, LiSi$_2$N$_3$, LiBH$_4$, LiBH$_4$—LiX (where x=Cl, Br, or I), LiNH$_2$, Li$_2$NH, LiBH$_4$—LiNH$_2$, Li$_3$AlH$_6$, LiI, Li$_3$InCl$_6$, Li$_2$CdC$_{14}$, Li$_2$MgCl$_4$, LiCdI$_4$, Li$_2$ZnI$_4$, Li$_3$OCl, Li$_2$B$_4$O$_7$, Li$_2$O—B$_2$O$_3$—P$_2$O$_5$, and combinations thereof.

In certain variations, the first plurality of solid-state electrolyte particles 30 may include one or more electrolyte materials selected from the group consisting of: Li$_2$S—P$_2$S$_5$ system, Li$_2$S—P$_2$S$_5$-MO$_x$ system (where 1<x<7), Li$_2$S—P$_2$S$_5$-MS$_x$ system (where 1<x<7), Li$_{10}$GeP$_2$S$_{12}$ (LGPS), Li$_6$PS$_5$X (where X is Cl, Br, or I) (lithium argyrodite), Li$_7$P$_2$S$_8$I, Li$_{10.35}$Ge$_{1.35}$P$_{1.65}$S$_{12}$, Li$_{3.25}$Ge$_{0.25}$P$_{0.75}$S$_4$ (thio-LISICON), Li$_{10}$SnP$_2$S$_{12}$, Li$_{10}$SiP$_2$S$_{12}$, Li$_{9.54}$Si$_{1.74}$P$_{1.44}$S$_{11.7}$Cl$_{0.3}$, (1-x)P$_2$S$_5$-xLi$_2$S (where 0.5≤x≤0.7), Li$_{3.4}$Si$_{0.4}$P$_{0.6}$S$_4$, PLi$_{10}$GeP$_2$S$_{11.7}$O$_{0.3}$, Li$_{9.6}$P$_3$S$_{12}$, Li$_7$P$_3$S$_{11}$, Li$_9$P$_3$S$_9$O$_3$, Li$_{10.35}$Ge$_{1.35}$P$_{1.63}$S$_{12}$, Li$_{9.81}$Sn$_{0.81}$P$_{2.19}$S$_{12}$, Li$_{10}$ (Si$_{0.5}$Ge$_{0.5}$)P$_2$S$_{12}$, Li$_{10}$(Ge$_{0.5}$Sn$_{0.5}$)P$_2$S$_{12}$, Li$_{10}$(Si$_{0.5}$Sn$_{0.5}$)P$_2$S$_{12}$, Li$_{3.833}$Sn$_{0.833}$As$_{0.16}$S$_4$, and combinations thereof.

Although not illustrated, the skilled artisan will recognize that in certain instances, one or more binder particles may be mixed with the solid-state electrolyte particles 30. For example, in certain aspects the solid-state electrolyte layer 26 may include greater than or equal to about 0 wt. % to less than or equal to about 10 wt. %, and in certain aspects, optionally greater than or equal to about 0.5 wt. % to less than or equal to about 10 wt. %, of the one or more binders. The one or more polymeric binders may include, for example only, polyvinylidene difluoride (PVDF), polytetrafluoroethylene (PTFE), ethylene propylene diene monomer (EPDM) rubber, nitrile butadiene rubber (NBR), styrene-butadiene rubber (SBR), and lithium polyacrylate (LiPAA).

In certain instances, the solid-state electrolyte particles 30 (and the optionally one or more binder particles) may be wetted by a small amount of liquid electrolyte, for example, to improve ionic conduction between the solid-state electrolyte particles 30. The solid-state electrolyte particles 30 may be wetted by greater than or equal to about 0 wt. % to less than or equal to about 40 wt. %, optionally greater than or equal to about 0.1 wt. % to less than or equal to about 40 wt. %, and in certain aspects, optionally greater than or equal to about 5 wt. % to less or equal to about 10 wt. %, of the liquid electrolyte, based on the weight of the solid-state electrolyte particles 30. In certain variations, Li$_7$P$_3$S$_{11}$ may be wetted by an ionic liquid electrolyte including LiTFSI-triethylene glycol dimethyl ether.

The negative electrode 22 may be formed from a lithium host material that is capable of functioning as a negative terminal of a lithium-ion battery. For example, in certain variations, the negative electrode 22 may be defined by a plurality of the negative solid-state electroactive particles 50. In certain instances, as illustrated, the negative electrode 22 is a composite comprising a mixture of the negative solid-state electroactive particles 50 and the second plurality of solid-state electrolyte particles 90. For example, the negative electrode 22 may include greater than or equal to about 30 wt. % to less than or equal to about 98 wt. %, and in certain aspects, optionally greater than or equal to about 50 wt. % to less than or equal to about 95 wt. %, of the negative solid-state electroactive particles 50 and greater than or equal to about 0 wt. % to less than or equal to about 50 wt. %, and in certain aspects, optionally greater than or equal to about 5 wt. % to less than or equal to about 20 wt. %, of the second plurality of solid-state electrolyte particles 90. The second plurality of solid-state electrolyte particles 90 may be the same as or different from the first plurality of solid-state electrolyte particles 30.

In certain variations, the negative solid-state electroactive particles 50 may be lithium-based including, for example, a lithium alloy and/or a lithium metal. In other variations, the negative solid-state electroactive particles 50 may be silicon-based comprising, for example, silicon, a silicon alloy and/or silicon-graphite mixture. In still other variations, the negative electrode 22 may be a carbonaceous anode and the negative solid-state electroactive particles 50 may comprise one or more negative electroactive materials, such as graphite, graphene, hard carbon, soft carbon, and carbon nanotubes (CNTs). In still further variations, the negative electrode 22 may comprise one or more negative electroactive materials, such as lithium titanium oxide ($Li_4Ti_5O_{12}$); one or more metal oxides, such as $TiO_2$ and/or $V_2O_5$; and metal sulfides, such as FeS. Thus, the negative solid-state electroactive particles 50 may be selected from the group including, for example only, lithium, graphite, graphene, hard carbon, soft carbon, carbon nanotubes, silicon, silicon-containing alloys, tin-containing alloys, and combinations thereof.

In certain variations, the negative electrode 22 may further include one or more conductive additives and/or binder materials. For example, the negative solid-state electroactive particles 50 and the second plurality of solid-state electrolyte particles 90 may be optionally intermingled with one or more electrically conductive materials (not shown) that provide an electron conduction path and/or at least one polymeric binder material (not shown) that improves the structural integrity of the negative electrode 22.

For example, the negative solid-state electroactive particles 50 and the second plurality of solid-state electrolyte particles 90 may be optionally intermingled with binders, such as polyvinylidene difluoride (PVDF), poly(vinylidene fluoride-co-hexafluoropropylene (PVdF-HFP), polytetrafluoroethylene (PTFE), carboxymethyl cellulose (CMC), styrene ethylene butylene styrene copolymer (SEBS), ethylene propylene diene monomer (EPDM) rubber, nitrile butadiene rubber (NBR), styrene-butadiene rubber (SBR), and/or lithium polyacrylate (LiPAA) binders. Electrically conductive materials may include, for example, carbon-based materials or a conductive polymer. Carbon-based materials may include, for example, particles of graphite, acetylene black (such as KETCHEN™ black or DENKA™ black), carbon fibers and nanotubes, graphene (such as, graphene oxide), carbon black (such as, Super P), and the like. Examples of a conductive polymer may include polyaniline, polythiophene, polyacetylene, polypyrrole, and the like. In certain aspects, mixtures of the conductive additives and/or binder materials may be used.

The negative electrode 22 may include greater than or equal to about 0 wt. % to less than or equal to about 30 wt. %, and in certain aspects, optionally greater than or equal to about 2 wt. % to less than or equal to about 10 wt. %, of the one or more electrically conductive additives; and greater than or equal to about 0 wt. % to less than or equal to about 20 wt. %, and in certain aspects, optionally greater than or equal to about 1 wt. % to less than or equal to about 10 wt. %, of the one or more binders.

The negative solid-state electroactive particles 50 and the solid-state electrolyte particles 90 (and/or the optional electrically conductive additives and/or optional binders) may be disposed in one or more layers to define the three-dimensional structure of the negative electrode 22. The negative electrode 22 (including the one or more layers) may have a thickness greater than or equal to about 10 μm to less than or equal to about 2000 μm. In certain variations, the negative solid-state electroactive particles 50 and the solid-state electrolyte particles 90 (and/or the optional electrically conductive additives and/or optional binders) may be disposed on or embedded within a porous material or metal foam 100A. For example, the negative solid-state electroactive particles 50 and the solid-state electrolyte particles 90 (and/or the optional electrically conductive additives and/or optional binders) may be dispersed within the pores 102 of the metal foam 100A.

Figure 2:
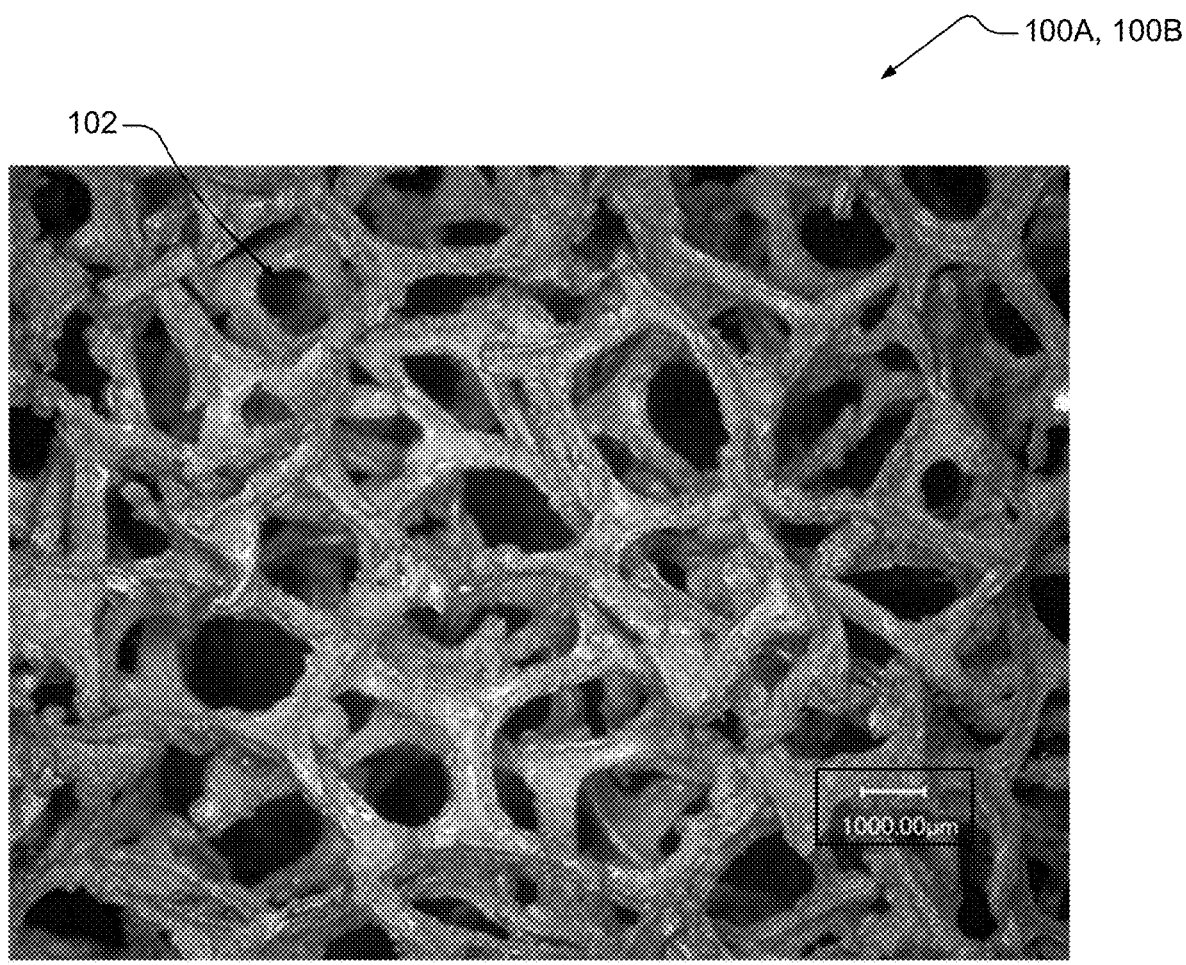
FIG. 2 is an electron microscope image of an example metal foam, such as included in the example solid-state battery illustrated in FIG. 1, in accordance with various aspects of the present disclosure.

As illustrated in FIG. 2, the metal foam 100A may be a porous material having a porosity greater than or equal to about 80 vol. % to less than or equal to about 99 vol. %, and in certain aspects, optionally greater than or equal to about 80 vol. % to less than or equal to about 95 vol. %. The pores 102 may have an average diameter greater than or equal to about 2 μm to less than or equal to about 5000 μm, and in certain aspects, optionally greater than or equal to about 100 μm to less than or equal to about 1000 μm.

The metal foams 100A may include at least one of aluminum (Al) foam, nickel (Ni) foam, copper (Cu) foam, nickel-chromium (Ni—Cr) foam, nickel-tin (Ni—Sn) foam, and titanium (Ti) foam. In certain aspects, the metal foam 100A may be carbon or graphene coated metal foams. The carbon or graphene coatings may inhibit corrosion of the metal foam 100A. The metal foam 100A may have thicknesses (along the x-axis) greater than or equal to about 100 μm to less than or equal to about 3,000 μm, and in certain aspects, optionally greater than or equal to about 500 μm to less than or equal to about 2,500 μm. The metal foam 100A may provide numerous electronic paths and/or a reduced internal resistance within the battery 20 to, for example only, reduce resistive losses and promote power capabilities within the battery 20.

Although a metal foam (e.g., metal foam 100A, 100B) is discussed herethroughout it is understood that in each instance the current technology also applies to other porous materials having a porosity greater than or equal to about 80 vol. % to less than or equal to about 99 vol. %, and in certain aspects, optionally greater than or equal to about 80 vol. % to less than or equal to about 95 vol. % and an average diameter greater than or equal to about 2 μm to less than or equal to about 5000 μm, and in certain aspects, optionally greater than or equal to about 100 μm to less than or equal to about 1000 μm, such as carbon nanofiber three-dimensional foam, graphene foam, carbon cloth, carbon fiber-embedded carbon nanotubes, carbon nanotubes three-dimensional current collectors (such as, carbon nanotube paper), graphene-nickel foam, and the like.

With renewed reference to FIG. 1, the positive electrode 24 may be formed from a lithium-based or electroactive material that can undergo lithium intercalation and deintercalation while functioning as the positive terminal of the battery 20. For example, in certain variations, the positive electrode 24 may be defined by a plurality of the positive solid-state electroactive particles 60. In certain instances, as illustrated, the positive electrode 24 is a composite comprising a mixture of the positive solid-state electroactive particles 60 and the third plurality of solid-state electrolyte particles 92. For example, the positive electrode 24 may include greater than or equal to about 30 wt. % to less than or equal to about 98 wt. %, and in certain aspects, optionally greater than or equal to about 50 wt. % to less than or equal to about 95 wt. %, of the positive solid-state electroactive particles 60 and greater than or equal to about 0 wt. % to less than or equal to about 50 wt. %, and in certain aspects, optionally greater than or equal to about 5 wt. % to less than or equal to about 20 wt. %, of the third plurality of solid-state electrolyte particles 92.

The third plurality of solid-state electrolyte particles 92 may be the same as or different from the first and/or second pluralities of solid-state electrolyte particles 30, 90. In certain variations, the positive electrode 24 may be one of a layered-oxide cathode, a spinel cathode, and a polyanion cathode. For example, in the instances of a layered-oxide cathode (e.g., rock salt layered oxides), the positive solid-state electroactive particles 60 may comprise one or more positive electroactive materials selected from $LiCoO_2$, $LiNi_xMn_yCo_{1-x-y}O_2$ (where $0 \leq x \leq 1$ and $0 \leq y \leq 1$), $LiNi_xMn_yAl_{1-x-y}O_2$ (where $0 < x \leq 1$ and $0 < y \leq 1$), $LiNi_xMn_{1-x}O_2$ (where $0 \leq x \leq 1$), and $Li_{1+x}MO_2$ (where $0 \leq x \leq 1$) for solid-state lithium-ion batteries. The spinel cathode may include one or more positive electroactive materials, such as $LiMn_2O_4$ and $LiNi_{0.5}Mn_{1.5}O_4$. The polyanion cation may include, for example, a phosphate, such as $LiFePO_4$, $LiVPO_4$, $LiV_2(PO_4)_3$, $Li_2FePO_4F$, $Li_3Fe_3(PO_4)_4$, or $Li_3V_2(PO_4)F_3$ for lithium-ion batteries, and/or a silicate, such as $LiFeSiO_4$ for lithium-ion batteries. In other instances, the positive electrode 24 may include one or more low voltage materials, such as lithium metal oxide/sulfide (like $LiTiS_2$) and/or lithium sulfide.

In various aspects, the positive solid-state electroactive particles 60 may comprise one or more positive electroactive materials selected from the group consisting of $LiCoO_2$, $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where $0 \leq x \leq 1$), $LiMn_2O_4$, $LiNi_xMn_{1.5}O_4$, $LiFePO_4$, $LiVPO_4$, $LiV_2(PO_4)_3$, $Li_2FePO_4F$, $Li_3Fe_3(PO_4)_4$, $Li_3V_2(PO_4)F_3$, $LiFeSiO_4$, $LiTiS_2$, and combinations thereof. In certain aspects, the positive solid-state electroactive particles 60 may be coated (for example, by $LiNbO_3$, $Al_2O_3$, $Li_2ZrO_3$, and/or $Li_3PO_4$) and/or the positive electroactive material may be doped (for example, by aluminum and/or magnesium).

In certain variations, the positive electrode 24 may further include one or more conductive additives and/or binder materials. For example, the positive solid-state electroactive particles 60 and the third plurality of solid-state electrolyte particles 92 may be optionally intermingled with one or more electrically conductive materials (not shown) that provide an electron conduction path and/or at least one polymeric binder material (not shown) that improves the structural integrity of the positive electrode 24.

For example, the positive solid-state electroactive particles 60 and the third plurality of solid-state electrolyte particles 92 may be optionally intermingled with binders, like polyvinylidene difluoride (PVDF), poly(vinylidene fluoride-co-hexafluoropropylene (PVdF-HFP), polytetrafluoroethylene (PTFE), sodium carboxymethyl cellulose (CMC), styrene ethylene butylene styrene copolymer (SEBS), ethylene propylene diene monomer (EPDM) rubber, nitrile butadiene rubber (NBR), styrene-butadiene rubber (SBR), and/or lithium polyacrylate (LiPAA) binders. Electrically conductive materials may include, for example, carbon-based materials. Carbon-based materials may include, for example, particles of graphite, acetylene black (such as KETCHEN™ black or DENKA™ black), carbon fibers and nanotubes, graphene (such as graphene oxide), carbon black (such as Super P), and the like. In certain aspects, mixtures of the conductive additives and/or binder materials may be used.

The positive electrode 24 may include greater than or equal to about 0 wt. % to less than or equal to about 30 wt. %, and in certain aspects, optionally greater than or equal to about 2 wt. % to less than or equal to about 10 wt. %, of the one or more electrically conductive additives; and greater than or equal to about 0 wt. % to less than or equal to about 20 wt. %, and in certain aspects, optionally greater than or equal to about 1 wt. % to less than or equal to about 10 wt. %, of the one or more binders.

The positive solid-state electroactive particles 60 and the solid-state electrolyte particles 92 (and/or the optional electrically conductive additives and/or optional binders) may be disposed in one or more layers to define the three-dimensional structure of the positive electrode 24. The positive electrode 24 (including the one or more layers) may have a thickness greater than or equal to about 10 μm to less than or equal to about 2000 μm. In certain variations, the positive solid-state electroactive particles 60 and the solid-state electrolyte particles 92) and/or the optional electrically conductive additives and/or optional binders) may be disposed on or embedded within a porous material or metal foam 100B. For example, the positive solid-state electroactive particles 60 and the solid-state electrolyte particles 92 (and/or the optional electrically conductive additives and/or optional binders) may be dispersed within the pores 102 of the metal foam 100B.

The metal foam 100B may be the same or different from the metal foam 100A. For example, the metal foam 100B may be a porous material having a porosity greater than or equal to about 80 vol. % to less than or equal to about 99 vol. %, and in certain aspects, optionally greater than or equal to about 80 vol. % to less than or equal to about 95 vol. %, where the pores 102 have an average diameter greater than or equal to about 2 μm to less than or equal to about 5000 μm, and in certain aspects, optionally greater than or equal to about 100 μm to less than or equal to about 1000 μm. The metal foams 100B may include at least one of aluminum (Al) foam, nickel (Ni) foam, copper (Cu) foam, nickel-chromium (Ni—Cr) foam, nickel-tin (Ni—Sn) foam, and titanium (Ti) foam. In certain aspects, the metal foam 100B may be carbon or graphene coated metal foams. The metal foam 100B may have thicknesses (along the x-axis) greater than or equal to about 100 μm to less than or equal to about 3,000 μm, and in certain aspects, optionally greater than or equal to about 500 μm to less than or equal to about 2,500 μm.

Figure 3:
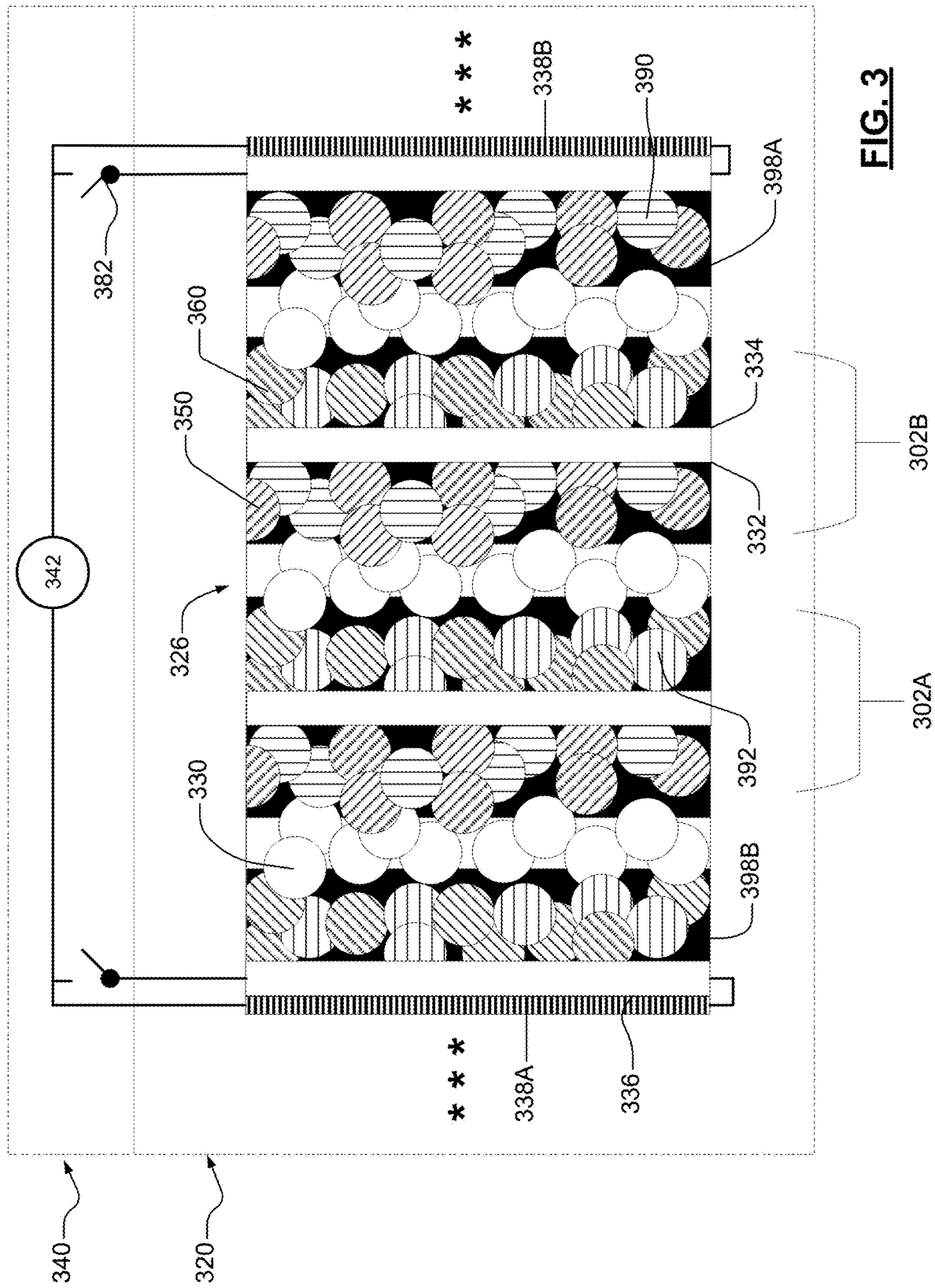
FIG. 3 is an illustration of an example solid-state battery including a metal foam and an electrothermal material foil in accordance with various aspects of the present disclosure.

In various aspects, as illustrated in FIG. 3, the present disclosure provides another example solid-state battery 320. The solid-state battery 320 may include a plurality of electrodes, such as a first bipolar electrode 302A and a second bipolar electrode 302B. The asterisks are meant to illustrate that the solid-state battery 320 may include additional electrodes, as would be appreciated by the skilled artisan. Though bipolar configurations are discussed here-throughout, it is understood that in each instance the current technology also applies to other solid-state configurations, including monopolar configurations.

With renewed reference to FIG. 3, each of the bipolar electrodes 302A, 302B includes a first plurality of electroactive material particles 350 disposed on or adjacent to a first side or surface 332 of a bipolar current collector 336 and a second plurality of electroactive material particles 360 disposed on or adjacent to a second side or surface 334 of the bipolar current collector 336. The first plurality of electroactive material particles 350 may be negative solid-state electroactive material particles, such as detailed above in the context of negative solid-state electroactive particles 50. The second plurality of electroactive material particles 360 may be positive solid-state electroactive material particles, such as detailed above in the context of positive solid-state electroactive particles 60. In certain configurations, as illustrated, a first plurality of solid-state electrolyte particles 390 may be mixed or intermingled with the first plurality of electroactive material particles 350, and a second plurality of solid-state electrolyte particles 392 may be mixed or intermingled with the second plurality of electroactive material particles 360. The electroactive material particles 350 and the solid-state electrolyte particles 390 may be disposed on or embedded within a porous foam material 398A. Similarly, the electroactive material particles 360 and the solid-state electrolyte particles 392 may be disposed on or embedded within a porous foam material 398B.

A solid-state electrolyte layer 326 may be disposed between consecutive electrodes 302A, 302B. The solid-state electrolyte layer 326 may act as a separator that physically separates the first electrode 302A and the second electrode 302B. The solid-state electrolyte layer 326 may be defined by a third plurality of solid-state electrolyte particles 330. The solid-state electrolyte particles 350, 360, 330 may be the same or different. The skilled artisan will also recognize that, in certain configurations, the solid-state electrolyte layer 326 may be a dual-layered solid-state electrolyte, such as detailed in the context of FIG. 10.

Figure 8:
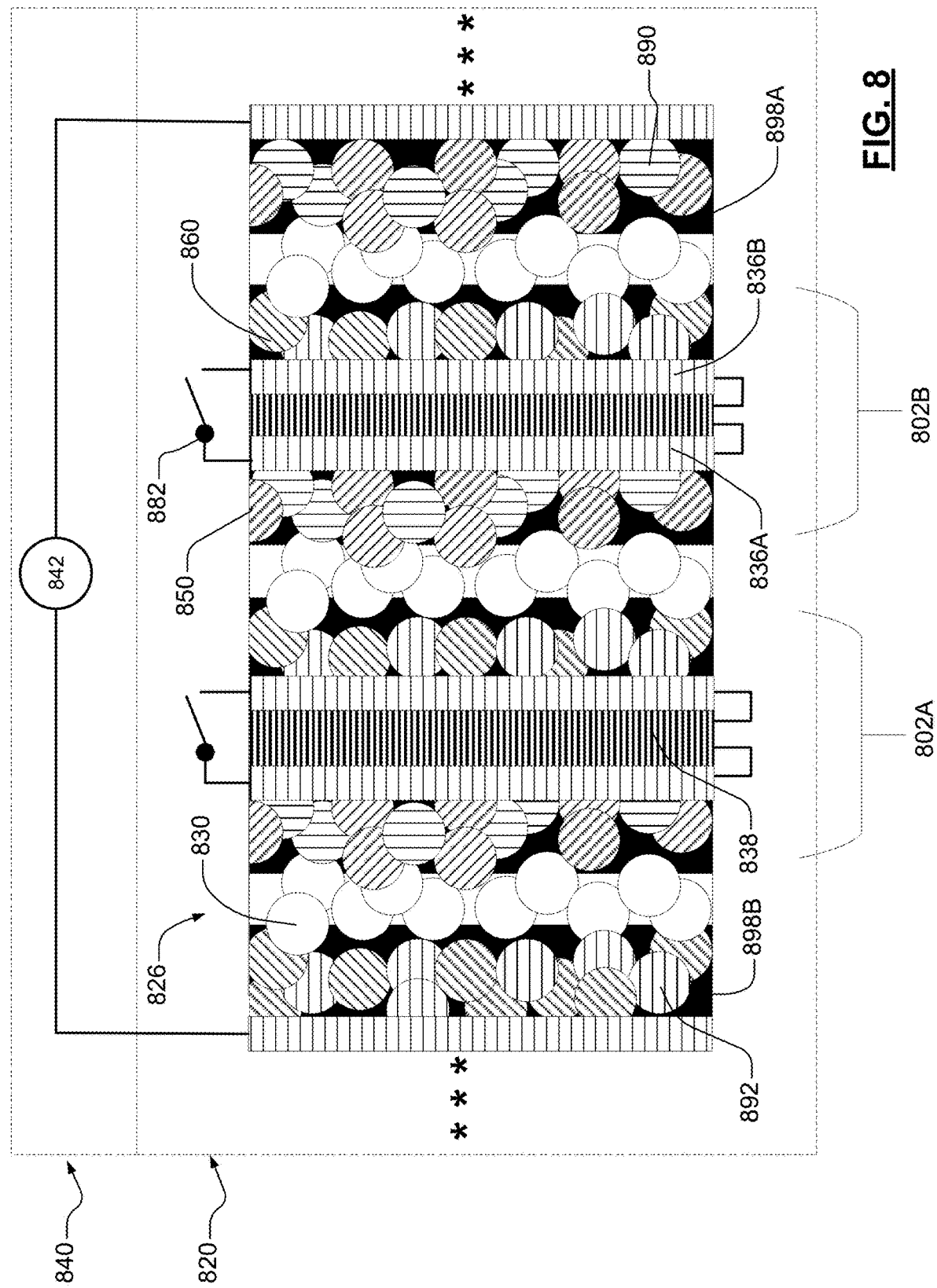
FIG. 8 is an illustration of another example solid-state battery including a metal foam and an electrothermal material foil in accordance with various aspects of the present disclosure.

The battery 320 further includes one or more electrothermal material foils 338A, 338B. For example, as illustrated, a first electrothermal material foil 338A may be disposed at a first terminal end of the battery pack 320, and a second electrothermal material foil 338B may be disposed at a second terminal end of the battery pack 320. However, the skilled artisan will appreciate the one or more electrothermal material foils may be disposed elsewhere within example batteries. For example, in certain configurations, electrothermal material foils may be disposed between each cell unit. In other configurations, electrothermal material foils may be disposed between every other cell unit. In still other configurations, electrothermal material foils may be disposed between one or more internal cells of the battery pack, such as illustrated in FIG. 8.

In each instance, the one or more electrothermal material foils 338A, 338B may have a thickness greater than or equal to about 5 μm to less than or equal to about 200 μm, and in certain aspects, optionally greater than or equal to about 20 μm to less than or equal to about 100 μm. The electrothermal material foils 338A, 338B may have a variety of configurations and patterns. For example, in certain instances, such as when the electrothermal material foils 338A, 338B are disposed on terminal ends of the battery pack 320, the electrothermal material foils 338A, 338B may take any of the shapes illustrated in FIG. 4.

Figure 4:
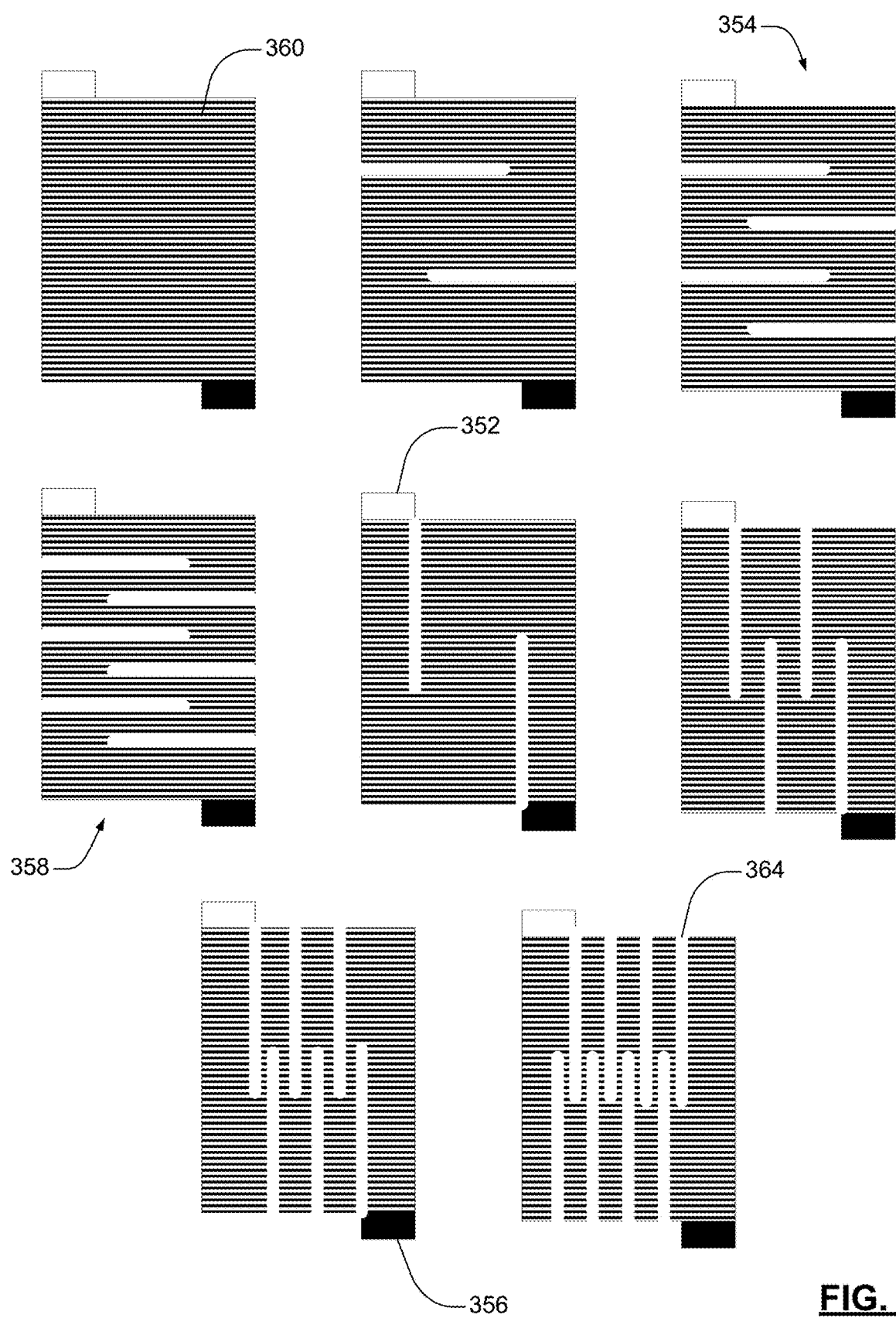
FIG. 4 includes illustrations of example patterns for example electrothermal material foils, such as included in the example solid-state battery illustrated in FIG. 3, in accordance with various aspects of the present disclosure.

As illustrated in FIG. 4, the electrothermal material foils 338A, 338B may be formed from a continuous sheet 362 having a first tab 352 extending from a first side 354 and a second tab 356 extending from a second side 358. The first side 354 may be parallel with the second side 358. The first tab 352 may be a first electrical connection point that will link that electrothermal material foils 338A, 338B to the external circuit 340. This first electrical connection point 352 may establish an electrical connection between the electrothermal material foil 338A, 338B and the external circuit 340. The second tab 356 may be a second electrical connection point. For example, the second tab 356 may be a connection point that will link consecutive electrothermal material foils 338A, 338B and/or the respective current collector 336. This second electrical connection point 356 may establish an electrical connection between the electrothermal material foils 338A, 338B and/or the respective current collector 336.

In certain instances, one or more blank areas or voids 364 may be defined in the continuous sheet 362. The one or more blank areas 364 may take a variety of configurations so as to create different resistances and controllable heating energies. Though various example patterns are illustrated in FIG. 4, the skilled artisan will appreciate that various other patterns are envisioned.

Figure 5:
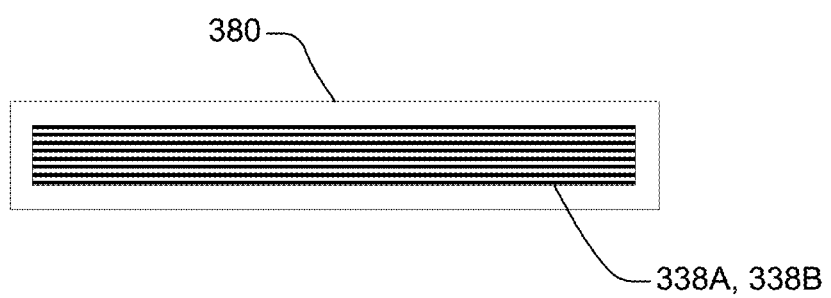
FIG. 5 is an illustration of an example electrothermal material foil, such as included in the example solid-state battery illustrated in FIG. 3, having an insulating coating in accordance with various aspects of the present disclosure.

In each instance, the one or more electrothermal material foils 338A, 338B may include nickel, stainless steel, copper, constantan (an alloy of nickel and copper), chromium, aluminum, iron, titanium, graphite, alloys, and the like (i.e., other resistor materials). For example, the one or more electrothermal material foils 338A, 338B may include iron-chromium-aluminum alloys and/or aluminum-nickel-iron alloys. In certain configurations, as illustrated in FIG. 5, one or more surfaces of the electrothermal material foils 338A 338B may be coated within an insulating material 380. For example, as illustrated, the insulating material 380 may form a continuous coating that substantially surrounds the electrothermal material foil 338A, 338B. The insulating material 380 may be selected from the group consisting of: polyvinylidene difluoride (PVdF), polytetrafluoroethylene (PTFE), polyethylene terephthalate (PET), polyvinyl chloride (PVC), polyimide, polycarbonate, polypropylene, polyester, and combinations thereof.

With renewed reference to FIG. 3, each of the one or more electrothermal material foils 338A, 338B is in electrical communication with an external circuit 340 and a load device 342 operatively connected to the external circuit 340. As illustrated, the external circuit 340 includes one or more switches 382 that can move the external circuit 340 from an open position (e.g., first operational state of the battery 320 or heating mode) (as illustrated) to a closed position (e.g., second operational state of the battery 320 or non-heating mode) (not illustrated). Like battery 20, battery 320 can generate an electric current during discharge by way of reversible electrochemical reactions that occur when the external circuit 340 is closed to connect the current collectors 336, allowing the current collectors 336 to collect and move free electrons to and from the external circuit 340. In an open position, electrons instead flow through the one or more electrothermal material foils 338A, 338B thereby generating ohmic heat in accordance with Joule's law of heating (e.g., $W=I^2Rt$, where W is electrical energy in Joules, R is resistance in Ohms, and I is current in amperes). For example, in the open position, the electrons may flow through the one or more electrothermal material foils 338A, 338B because the resistance of the one or more electrothermal material foils 338A, 338B is greater than that of the current collector 336. Thus, the one or more electrothermal material foils 338A, 338B may provide internal heating control, improving low-temperature or charging performance and ion transport in the instance of thick (e.g., greater than about 1000 μm) electrodes.

In various aspects, the present disclosure provides methods for monitoring a battery (such as, battery 320 illustrated in FIG. 3) and switching between an open, heating position (e.g., first operational state of the solid-state battery or heating mode) and a closed, non-heating position (e.g., second operational state of the solid-state battery or non-heating mode). The battery may in communication with a controller or control module that is configured to collect data (e.g., temperature, state of charge, and the like) from the battery and control one or more operating parameters of the battery (e.g., open, close).

Figure 6:
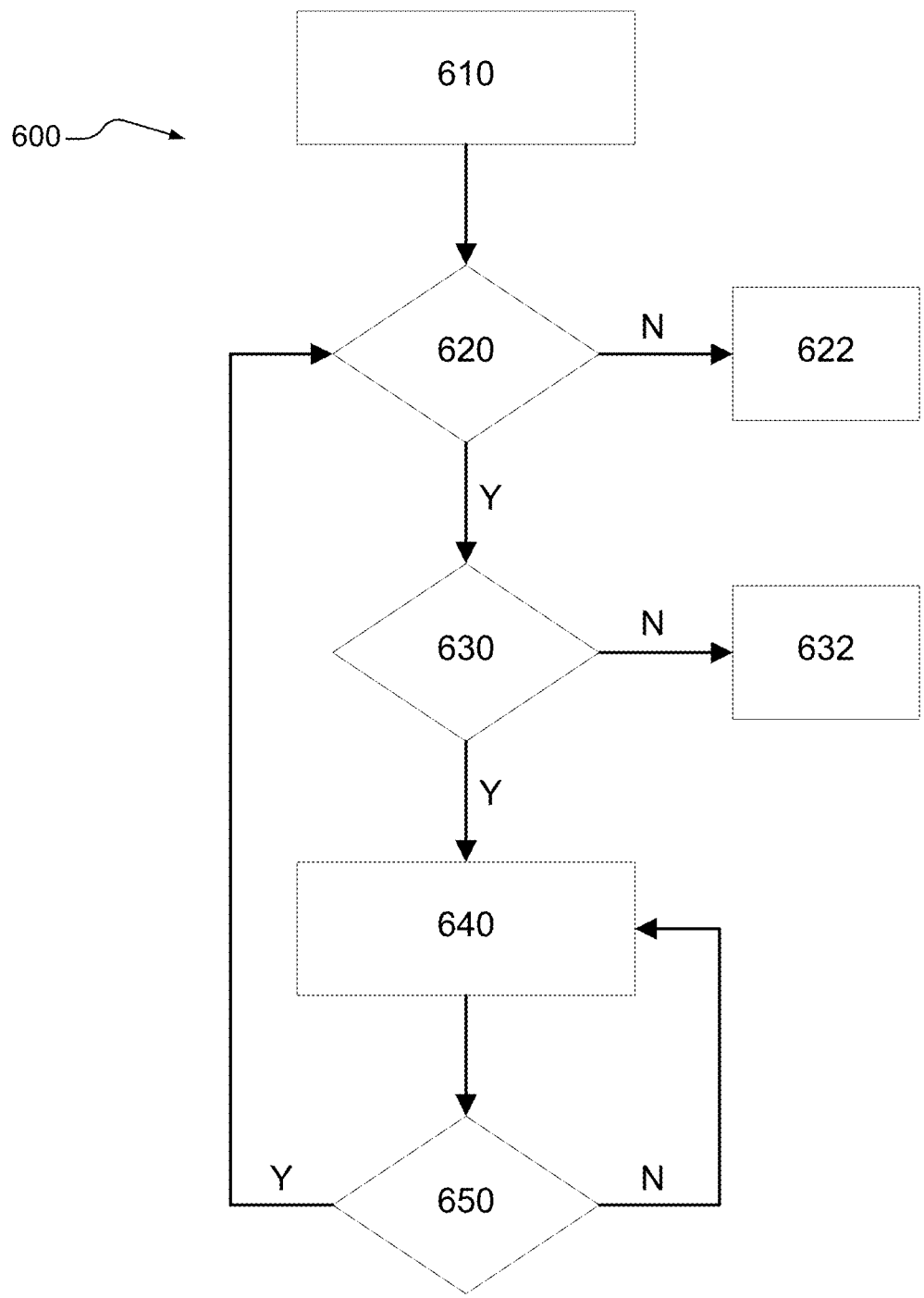
FIG. 6 is an example method of activating an electrothermal material foil, such as included in the example solid-state battery illustrated in FIG. 3, in accordance with various aspects of the present disclosure.

FIG. 6 illustrates an example method 600, for example, for warm-up in a cold climate. The method 600 may include initiating a cycle at 610 and determining an external temperature (T) at 620. As illustrated, if the temperature (T) is greater than a predetermined value (e.g., optionally about −10° C., optionally about −20° C., and in certain aspects, optionally about −30° C.), the method 600 may continue to 622, where an external circuit switch in the battery is moved to or kept in a closed, non-heating position and any heating is stopped. If the temperature (T) is less than the predetermined value, the method 600 may continue to 630, where the state of charge (SOC) of the battery is determined. If the state of charge (SOC) is less than a predetermined value (x) (e.g., optionally about 10%, optionally about 15%, and in certain aspects, optionally about 20%), the method 600 may continue to 632, where the external circuit switch is moved to or kept in a closed, non-heating position (e.g., second operational state of the battery or non-heating mode) and any heating is stopped. If the state of charge (SOC) is greater than the predetermined value (x), the method 600 may continue to 640, where the external circuit switch is moved to or kept in an opened, heating position (e.g., first operational state of the battery or heating mode). Heating may continue at 650 for a predetermined time (t). For example, the predetermined time (t) may be about 2 seconds, optionally about 5 seconds, and in certain aspects, optionally about 10 seconds. As illustrated, if heating has continued for a period greater than the predetermined time (t), the method 600 will return to 620. If heating has continued for a period less than the predetermined time (t), the method 600 will return to 640.

Figure 7:
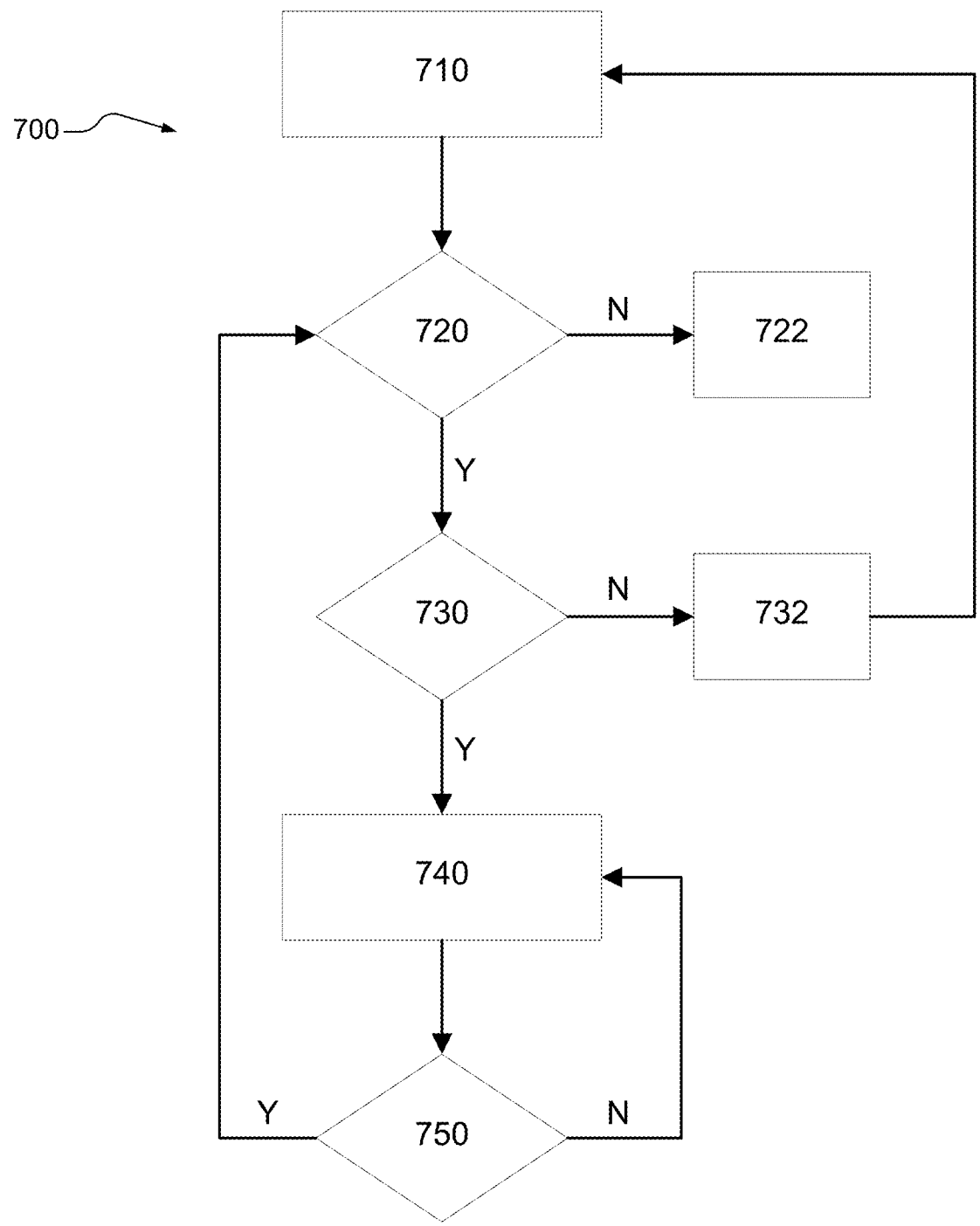
FIG. 7 is another example method of activating an electrothermal material foil, such as included in the example solid-state battery illustrated in FIG. 3, in accordance with various aspects of the present disclosure.

FIG. 7 illustrates another example method 700, for example, for fast charge. The method 700 may include initiating a cycle at 710 and determining a state of charge at 720. As illustrated, if the state of charge (SOC) is less than a predetermined value (x) (e.g., optionally about 70%, optionally about 80%, and in certain aspects, optionally about 90%), the method 700 may continue to 722, where the external circuit switch is moved to or kept in a closed, non-heating position (e.g., second operational state of the battery or non-heating mode) and any heating and charging is stopped. If the state of charge (SOC) is greater than the predetermined value (x), the method 700 may continue to 730, where the temperature (T) is determined. As illustrated, if the temperature (T) is greater than a predetermined value (e.g., optionally about 45° C., optionally about 50° C., and in certain aspects, optionally about 55° C.), the method 700 may continue to 732, where an external circuit switch in the battery is moved to or kept in a closed, non-heating position (e.g., second operational state of the battery or non-heating mode) and any heating is stopped. The method 700 may then return to 710. If the temperature (T) is less than the predetermined value, the method 700 may continue to 740, where the external circuit switch is moved to or kept in an opened, heating position (e.g., first operational state of the battery or heating mode). Heating may continue at 750 for a predetermined time (t). For example, the predetermined time (t) may be about 20 seconds, optionally about 60 seconds, and in certain aspects, optionally about 120 seconds. As illustrated, if heating has continued for a period greater than the predetermined time (t), the method 700 will return to 720. If heating has continued for a period less than the predetermined time (t), the method 700 will return to 740.

As noted above, in various aspects, electrothermal material foils may be disposed between one or more internal cells of the battery pack, such as illustrated in FIG. 8. In various aspects, as illustrated in FIG. 8, the present disclosure provides another example solid-state battery 820. The solid-state battery 820 may include a plurality of electrodes, such as a first bipolar electrode 802A and a second bipolar electrode 802B. The asterisks are meant to illustrate that the solid-state battery 820 may include additional electrodes, as would be appreciated by the skilled artisan.

Each of the bipolar electrodes 802A, 802B includes a first plurality of electroactive material particles 850 disposed on or adjacent to a first current collector 836A and a second plurality of electroactive material particles 360 disposed on or adjacent to a second current collector 836B. The first and second current collectors 836A, 836B may be the same or different. A first current collector 836A and/or a second current collector 836B of a first electrode of the solid-state battery 820 and a first current collector 836A and/or a second current collector 836 of a second electrode of the solid-state battery 820 may be in electrical communication with an external circuit 840 and a load device 842 operatively connected to the external circuit 840. In certain instances, the solid-state battery 820 includes one or more switches 882 that, like switches 382, can move the solid-state battery 820 from an open position (e.g., first operational state) (as illustrated) to a closed position (e.g., second operational state or non-heating mode) with respect to the external circuit 840.

The first plurality of electroactive material particles 850 may be negative solid-state electroactive material particles, such as detailed above in the context of negative solid-state electroactive particles 50. The second plurality of electroactive material particles 860 may be positive solid-state electroactive material particles, such as detailed above in the context of positive solid-state electroactive particles 60. In certain configurations, as illustrated, a first plurality of solid-state electrolyte particles 890 may be mixed or intermingled with the first plurality of electroactive material particles 850, and a second plurality of solid-state electrolyte particles 892 may be mixed or intermingled with the second plurality of electroactive material particles 860. The electroactive material particles 850 and the solid-state electrolyte particles 890 may be disposed on or embedded within a porous material 898A. Similarly, the electroactive material particles 860 and the solid-state electrolyte particles 892 may be disposed on or embedded within a porous material 898B.

A solid-state electrolyte layer 826 may be disposed between consecutive electrodes 802A, 802B. The solid-state electrolyte layer 826 may act as a separator that physically separates the first electrode 802A and the second electrode 802B. The solid-state electrolyte layer 826 may be defined by a third plurality of solid-state electrolyte particles 830. The electrolyte particles 830, 890, 892 may be the same or different. The skilled artisan will also recognize that, in certain configurations, the solid-state electrolyte layer 826 may be a dual-layered solid-state electrolyte, such as detailed in the context of FIG. 10.

The battery 820 further includes one or more electrothermal material foils 838. Similar to the electrothermal material foils 338A, 338B illustrated in FIG. 3, each of the one or more electrothermal material foils 838 may provide internal heating control, improving low-temperature or charging performance and ion transport in the instance of thick (e.g., greater than about 1000 μm) electrodes. As illustrated in FIG. 8, the electrothermal material foils 838 may be disposed between the first and second current collectors 836A, 836B. In each instance, the one or more electrothermal material foils 838 may have a thickness greater than or equal to about 5 µm to less than or equal to about 200 µm, and in certain aspects, optionally greater than or equal to about 20 µm to less than or equal to about 100 µm.

The electrothermal material foils 838 may have a variety of configurations and patterns. For example, in certain instances, such as when the electrothermal material foils 838 are disposed at an internal position in the battery pack 820, the electrothermal material foils 838 may take any of the shapes illustrated in FIG. 9. As illustrated, the electrothermal material foils 838 may be formed from a continuous sheet 862 having first and second tabs 852, 856 extending from a side of the continuous sheet 862. The first tab 852 may be a first electrical connection point.

Figure 9:
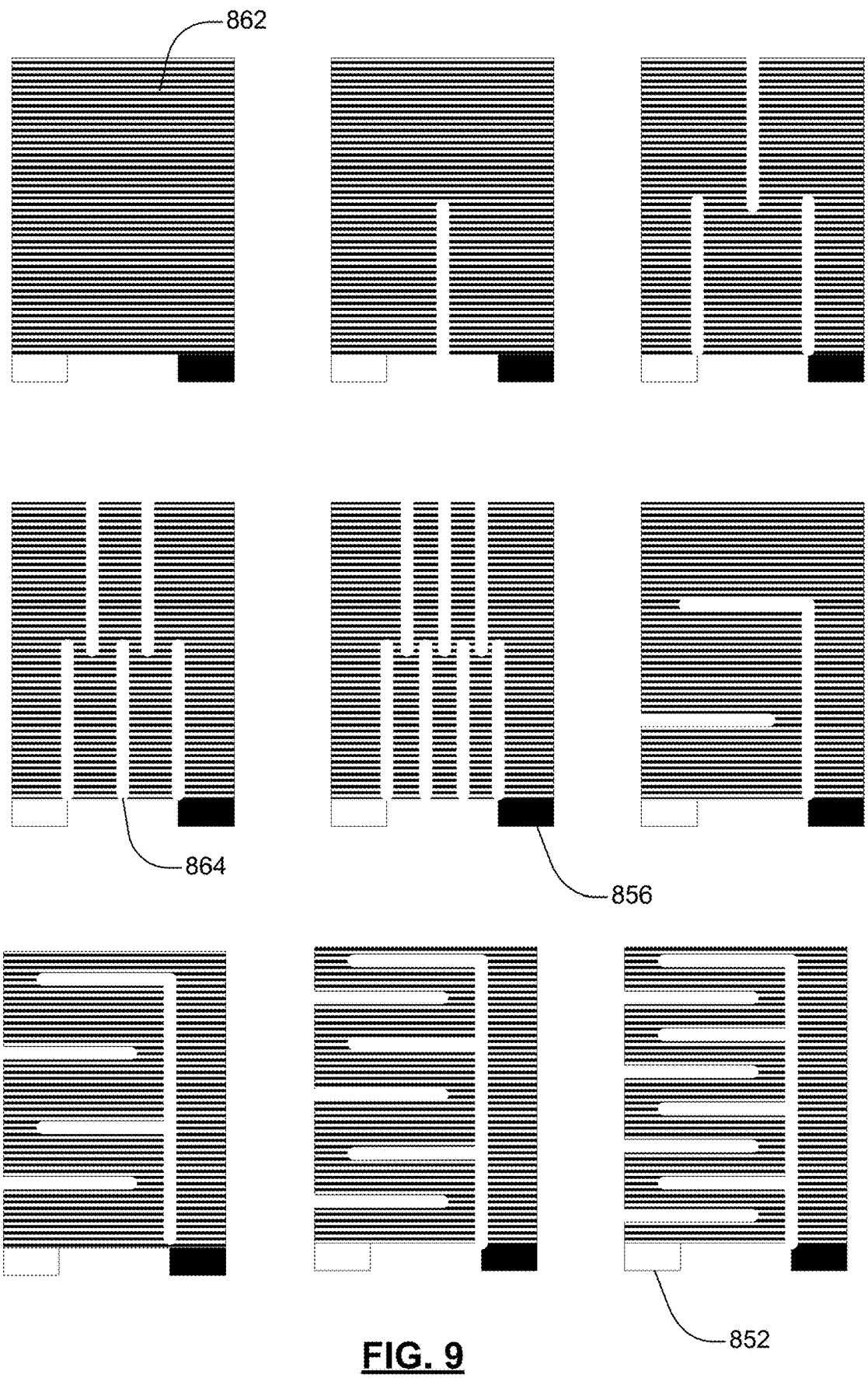
FIG. 9 includes illustrations of example patterns for example electrothermal material foils, such as included in the example solid-state battery illustrated in FIG. 8, in accordance with various aspects of the present disclosure.

The first electrical connection point 852 may establish an electrical connection between the electrothermal material foil 838 and the current collector 836A. The second tab 856 may be a second electrical connection point. The second electrical connection point 856 may establish electrical connection between the electrothermal material foil 838 and the current collector 836B. In certain instances, one or more blank areas or voids 864 may be defined in the continuous sheet 862. The one or more blank areas 864 may take a variety of configurations to create different resistances and controllable heating energies. Though various example patterns are illustrated in FIG. 9, the skilled artisan will appreciate that various other patterns are envisioned.

Figure 10:
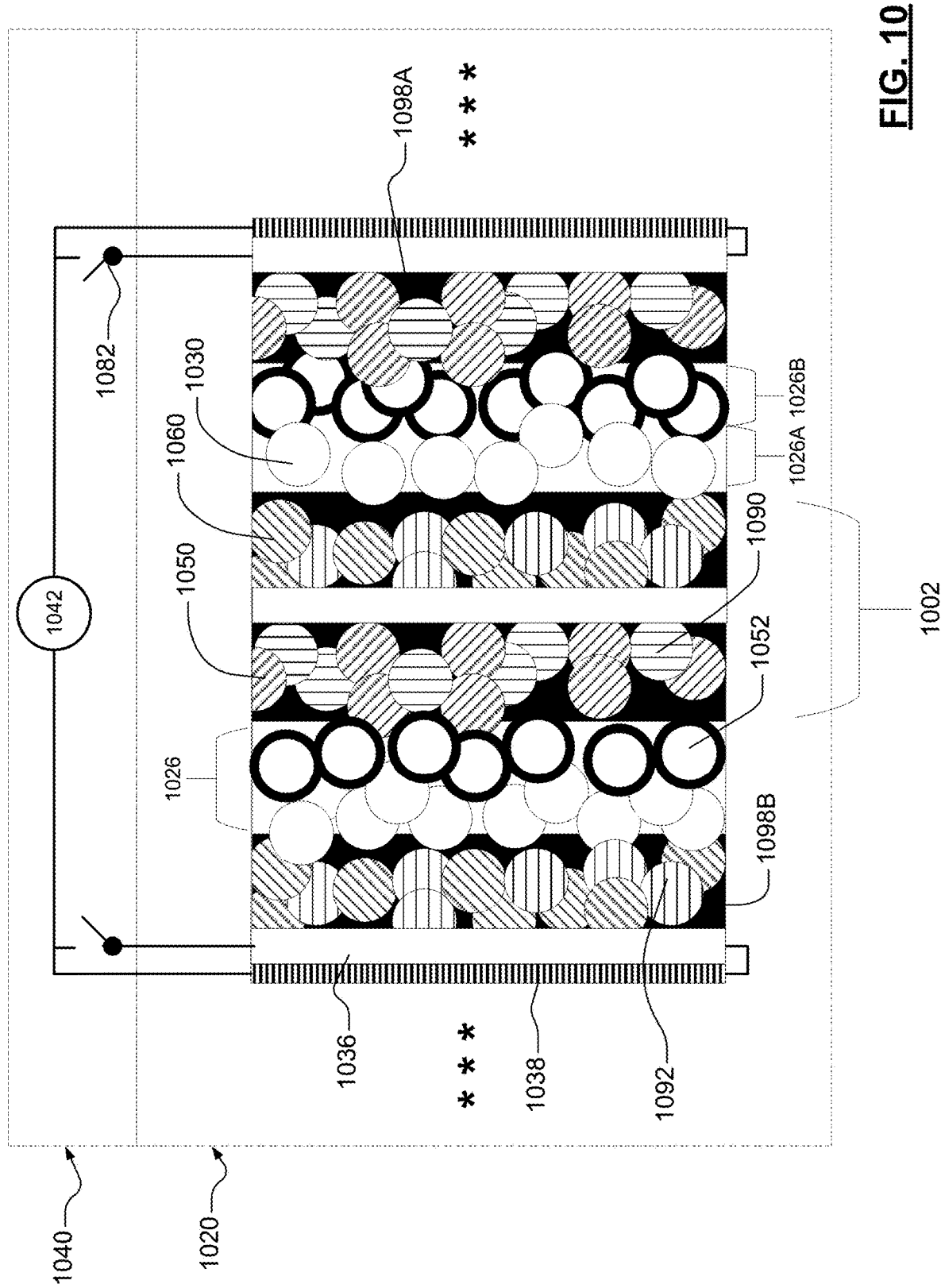
FIG. 10 is an illustration of another example solid-state battery including a metal foam, an electrothermal material foil, and a dual solid-state electrolyte layer in accordance with various aspects of the present disclosure.

The present disclosure provides another example solid-state battery 1020 in FIG. 10. The solid-state battery 1020 may include a plurality of electrodes, such as a first bipolar electrode 1002. The asterisks are meant to illustrate that the solid-state battery 1020 may include additional electrodes, as would be appreciated by the skilled artisan.

Each of the electrodes 1002 includes a first plurality of electroactive material particles 1050 disposed on or adjacent to a first surface of a current collector 1036 and a second plurality of electroactive material particles 1060 disposed on or adjacent to a second surface of the current collector 1036. A (first) current collector 1036 of a first electrode of the solid-state battery 1020 and a (second) current collector 1036 of a second electrode of the solid-state battery 1020 may be in electrical communication with an external circuit 1040 and a load device 1042 operatively connected to the external circuit 1040. In certain instances, the solid-state battery 1020 includes one or more switches 1082 that, like switches 382, can move the solid-state battery 1020 from an open position (e.g., first operational state) (as illustrated) to a closed position (e.g., second operational state or non-heating mode) with respect to the external circuit 1040.

The first plurality of electroactive material particles 1050 may be negative solid-state electroactive material particles, such as detailed above in the context of negative solid-state electroactive particles 50. The second plurality of electroactive material particles 1060 may be positive solid-state electroactive material particles, such as detailed above in the context of positive solid-state electroactive particles 60. In certain configurations, as illustrated, a first plurality of solid-state electrolyte particles 1090 may be mixed or intermingled with the first plurality of electroactive material particles 1050, and a second plurality of solid-state electrolyte particles 1092 may be mixed or intermingled with the second plurality of electroactive material particles 1060. The electroactive material particles 1050 and the solid-state electrolyte particles 1090 may be disposed on or embedded within a porous material 1098A. Similarly, the electroactive material particles 1060 and the solid-state electrolyte particles 1092 may be disposed on or embedded within a porous material 1098B.

A solid-state electrolyte layer 1026 may be disposed between consecutive electrodes 1002. The solid-state electrolyte layer 1026 may act as a separator that physically separates electrodes 1002. The solid-state electrolyte layer 1026 may be a dual-layered solid-state electrolyte having a first sublayer 1026A and a second sublayer 1026B. The first sublayer 1026A may be defined by a third plurality of solid-state electrolyte particles 1030. The second sublayer 1026B may be defined by a fourth plurality of solid-state electrolyte particles 1052. The third and fourth pluralities of solid-state electrolyte particles 1030, 1052 may be the same or different and may be the same or different from the first and second pluralities of solid-state electrolyte particles 1090, 1092.

The pluralities of solid-state electrolyte particles 1020, 1052, 1090, 1092 may include those solid-state electrolyte materials described in the context of FIG. 1. For example, the solid-state electrolyte layers 1026A, 1026B may be compact inorganic solid-state electrolyte layers. In other instances, the solid-state electrolyte layers 1026A, 1026B may be hybrid electrolyte layers including an organic component and/or an inorganic component.

The organic component may include one or more polymers and a liquid electrolyte. The one or more polymers may be selected from polyethylene glycol (PEG), poly(ethylene oxide) (PEO), poly(phenylene oxide) (PPO), poly(methyl methacrylate) (PMMA), polyacrylonitrile (PAN), polyvinylidene fluoride (PVDF), poly(vinylidene fluoride-co-hexafluoropropylene (PVDF-HFP), polyvinyl chloride (PVC), polytetrafluoroethylene (PTFE), carboxymethyl cellulose (CMC), styrene-butadiene (SBR), acrylonitrile butadiene rubber (NBR), poly(styrene-butadiene-styrene) (SBS), and combinations thereof. The liquid electrolyte may be, for example only, one of lithium bis(trifluoromethanesulfonyl)imide (LiTFSI)-triethylene glycol dimethyl ether, lithium hexafluorophosphate ($LiPF_6$)-ethylene carbonate (EC), diethyl carbonate (DEC) with one or more additives (such as vinylene carbonate (VC), fluoroethylene carbonate, vinyl ethylene carbonate, lithium bis(oxalato) borate), and lithium bis(trifluoromethanesulfonyl)imide (LiTFSI)-acetonitrile.

The inorganic component may include one or more sulfide-based particles, halide-based particles, hydride-based particles, oxide-based particles, and the like, as detailed above. The inorganic component may also include one or more lithium salts, such as lithium bis(trifluoromethanesulfonyl)imide (LiTFSI), lithium hexafluorophosphate ($LiPF_6$), lithium bis(fluorosulfonyl) imide (LiFSI), and/or lithium tetrafluoroborate ($LiBF_4$). In still further variations, the inorganic component may include one or more oxide ceramic nanoparticles, such as silicon dioxide ($SiO_2$), cerium dioxide ($CeO_2$), aluminum oxide ($Al_2O_3$), and/or zirconium dioxide ($ZrO_2$).

The battery 1020 further includes one or more electrothermal material foils 1038. Similar to the electrothermal material foils 338A, 338B illustrated in FIG. 3, each of the one or more electrothermal material foils 1038 may provide internal heating control, improving low-temperature or charging performance and ion transport in the instance of thick (e.g., greater than about 1000 µm) electrodes. As illustrate in FIG. 10, the electrothermal material foils 1038 may be disposed at each end of the battery pack 1020, similar to FIG. 3. Though not illustrated the skilled artisan will appreciate that in various instances the electrothermal material foil 1038 may be disposed elsewhere within example batteries. For example, in certain configurations, electrothermal material foils may be disposed between each cell unit.

In other configurations, electrothermal material foils may be disposed between every other cell unit. In still other configurations, electrothermal material foils may be disposed between one or more internal cells of the battery pack, such as illustrated in FIG. 8. In each instance, the one or more electrothermal material foils 1038 may have a thickness greater than or equal to about 5 μm to less than or equal to about 200 μm, and in certain aspects, optionally greater than or equal to about 10 μm to less than or equal to about 100 μm.

Figure 11:
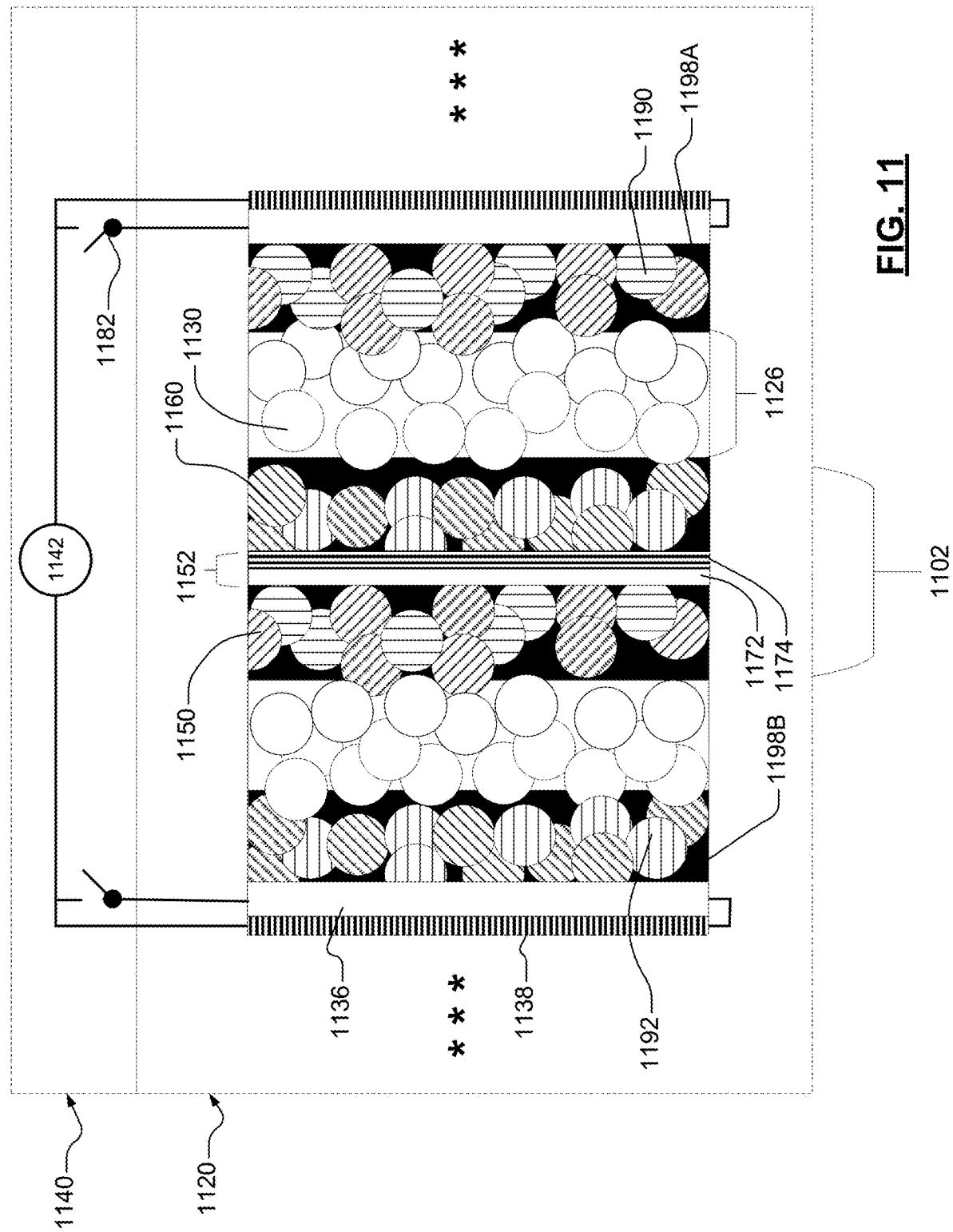
FIG. 11 is an illustration of another example solid-state battery including a metal foam, an electrothermal material foil, and a dual current collector in accordance with various aspects of the present disclosure.

The present disclosure provides another example solid-state battery 1120 in FIG. 11. The solid-state battery 1120 may include a plurality of electrodes, such as a first bipolar electrode 1102. The asterisks are meant to illustrate that the solid-state battery 1120 may include additional electrodes, as would be appreciated by the skilled artisan.

Each of the electrodes 1102 includes a first plurality of electroactive material particles 1150 disposed on or adjacent to a first surface of a current collector 1136, 1152 and a second plurality of electroactive material particles 1160 disposed on or adjacent to a second surface of the current collector 1136, 1152. A (first) current collector 1136 of a first electrode of the solid-state battery 1120 and a (second) current collector 1136 of a second electrode of the solid-state battery 1120 may be in electrical communication with an external circuit 1140 and a load device 1142 operatively connected to the external circuit 1140. In certain instances, the solid-state battery 1120 includes one or more switches 1182 that, like switches 382, can move the solid-state battery 1120 from an open position (e.g., first operational state) (as illustrated) to a closed position (e.g., second operational state or non-heating mode) with respect to the external circuit 1140.

The first plurality of electroactive material particles 1150 may be negative solid-state electroactive material particles, such as detailed above in the context of negative solid-state electroactive particles 50. The second plurality of electroactive material particles 1160 may be positive solid-state electroactive material particles, such as detailed above in the context of positive solid-state electroactive particles 60. In certain configurations, as illustrated, a first plurality of solid-state electrolyte particles 1190 may be mixed or intermingled with the first plurality of electroactive material particles 1150, and a second plurality of solid-state electrolyte particles 1192 may be mixed or intermingled with the second plurality of electroactive material particles 1160. The electroactive material particles 1150 (and the optional solid-state electrolyte particles 1190) may be disposed on or embedded within a porous material 1198A. Similarly, the electroactive material particles 1160 (and the optional solid-state electrolyte particles 1192) may be disposed on or embedded within a porous material 1198B.

As illustrated, the battery 1120 may include at least one dual current collector 1152 including a first current collector foil 1172 and a second current collector foil 1174. The first and second current collector foils 1172, 1174 may be disposed on a (top) surface of the metal foam 1198A and/or the metal foam 1198B. For example, the first current collector foil 1172 may be disposed on a first metal foam 1198A, and the second current collector foil 1174 may be disposed on a second metal foam 1198B. In certain instances, the first and second metal foams 1198A, 1198B may be defined by a continuous porous material. The first current collector foil 1172 may define the first side or surface of the current collector 1152, and the second current collector foil 1174 may define the second side or surface of the current collector 1152.

The first current collector foil 1172 may be different from the second current collector foil 1174. In certain variations, the first current collector foil 1172 may be a negative electrode current collector foil and the second current collector foil 1174 may be a positive electrode current collector foil. In each instance, the first and second current collector foils 1172, 1174 may each comprise at least one of stainless steel, aluminum, nickel, iron, titanium, copper, tin, or any other electrically conductive material known to those of skill in the art. The first and second current collectors foils 1172, 1174 may each have a thickness such that the current collector 1152 has a thickness greater than or equal to about 2 μm to less than or equal to about 30 μm.

A solid-state electrolyte layer 1126 may be disposed between consecutive electrodes 1102. The solid-state electrolyte layer 1126 may act as a separator that physically separates the electrode 1102. The solid-state electrolyte layer 1126 may be defined by a third plurality of solid-state electrolyte particles 1130. The electrolyte particles 1130, 1190, 1192 may be the same or different. The skilled artisan will also recognize that, in certain configurations, the solid-state electrolyte layer 1126 may be a dual-layered solid-state electrolyte, such as detailed in the context of FIG. 10.

The battery 1120 further includes one or more electrothermal material foils 1138. Similar to the electrothermal material foils 338A, 338B illustrated in FIG. 3, each of the one or more electrothermal material foils 1138 may provide internal heating control, improving low-temperature or charging performance and ion transport in the instance of thick (e.g., greater than about 1000 μm) electrodes. As illustrate in FIG. 11, an electrothermal material foil 1138 may be disposed at each end of the battery pack 1120, similar to FIG. 3. Though not illustrated the skilled artisan will appreciate that in various instances the electrothermal material foil 1138 may be disposed elsewhere within example batteries. For example, in certain configurations, electrothermal material foils may be disposed between each cell unit. In other configurations, electrothermal material foils may be disposed between every other cell unit. In still other configurations, electrothermal material foils may be disposed between one or more internal cells of the battery pack, such as illustrated in FIG. 8. In each instance, the one or more electrothermal material foils 1138 may have a thickness greater than or equal to about 5 μm to less than or equal to about 200 μm, and in certain aspects, optionally greater than or equal to about 10 μm to less than or equal to about 100 μm.

Figure 12:
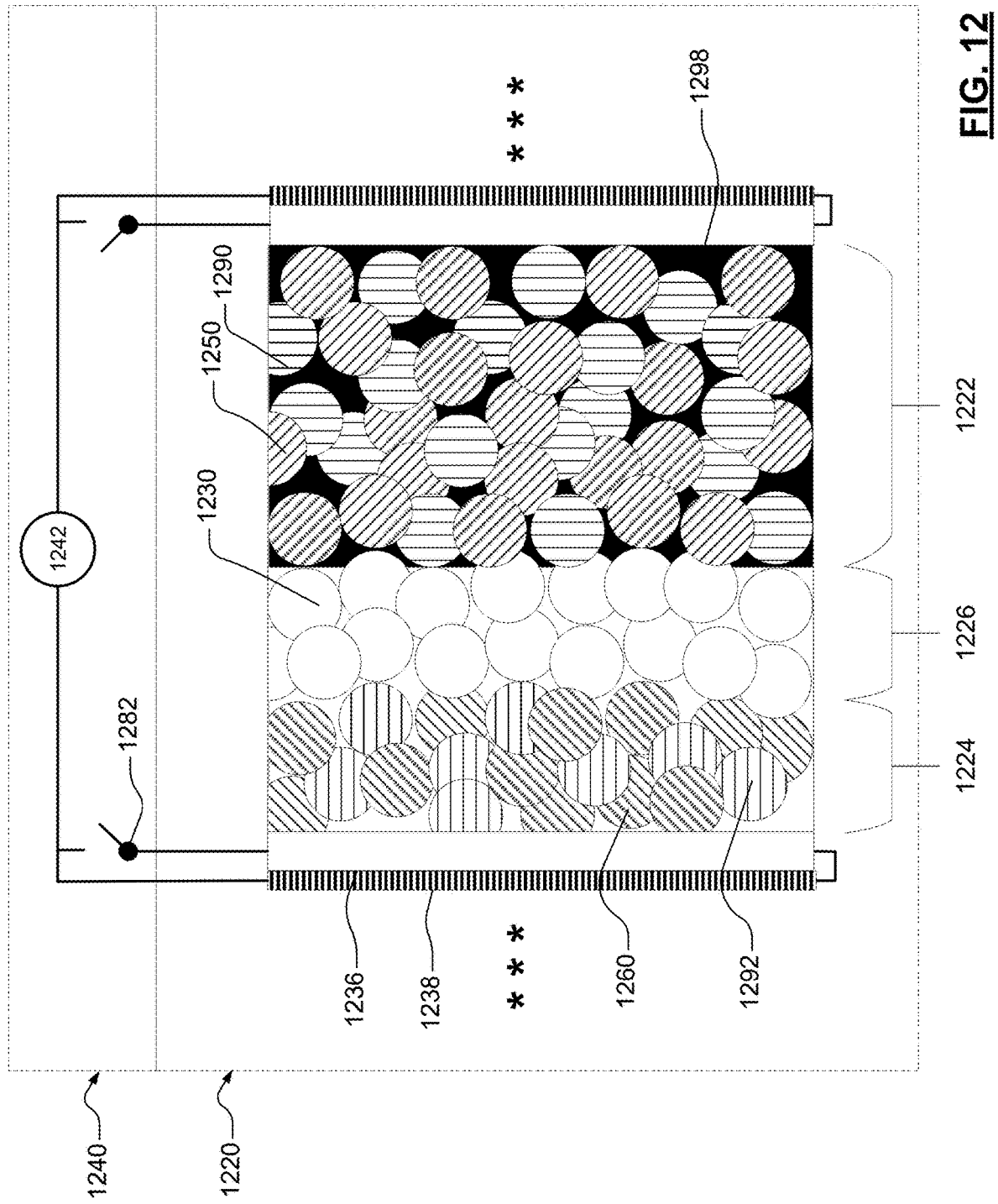
FIG. 12 is an illustration of another example solid-state battery including a partial metal foam and an electrothermal material foil in accordance with various aspects of the present disclosure.

The present disclosure provides another example solid-state battery 1220 in FIG. 12. The solid-state battery 1220 may include a plurality of bipolar electrodes. The asterisks are meant to illustrate that the solid-state battery 1220 may include additional cell units, as would be appreciated by the skilled artisan.

Each cell unit includes a first plurality of electroactive material particles 1250 disposed on or adjacent to a first surface of a current collector 1236 and a second plurality of electroactive material particles 1260 disposed on or adjacent to a second surface of the current collector 1236. A (first) current collector 1236 of a first electrode of the solid-state battery 1220 and a (second) current collector 1236 of a second electrode of the solid-state battery 1220 may be in electrical communication with an external circuit 1240 and a load device 1242 operatively connected to the external circuit 1240. In certain instances, the solid-state battery 1220 includes one or more switches 1282 that, like switches 382, can move the solid-state battery 1220 from an open position (e.g., first operational state) (as illustrated) to a closed position (e.g., second operational state or non-heating mode) with respect to the external circuit 1240.

The first plurality of electroactive material particles 1250 may be negative solid-state electroactive material particles, such as detailed above in the context of negative solid-state electroactive particles 50. The second plurality of electroactive material particles 1260 may be positive solid-state electroactive material particles, such as detailed above in the context of positive solid-state electroactive particles 60. In certain configurations, as illustrated, a first plurality of solid-state electrolyte particles 1290 may be mixed or intermingled with the first plurality of electroactive material particles 1250, and a second plurality of solid-state electrolyte particles 1292 may be mixed or intermingled with the second plurality of electroactive material particles 1260.

The battery 1020 may include a porous material 1298 in only a portion of the battery 1220. For example, as illustrated, the negative electrode 1222 may include a porous material 1298. For example, the electroactive material particles 1050 (and the optional solid-state electrolyte particles 1090) may be disposed on or embedded within the porous material 1298. The positive electrode 1224 may be free of a porous material 1298.

A solid-state electrolyte layer 1226 may be disposed between consecutive electrodes 1222, 1224. The solid-state electrolyte layer 1226 may act as a separator that physically separates the electrode 1202. The solid-state electrolyte layer 1226 may be defined by a third plurality of solid-state electrolyte particles 1230. The electrolyte particles 1230, 1290, 1292 may be the same or different. The skilled artisan will also recognize that, in certain configurations, the solid-state electrolyte layer 1226 may be a dual-layered solid-state electrolyte, such as detailed in the context of FIG. 10.

The battery 1220 further includes one or more electrothermal material foils 1238. Similar to the electrothermal material foils 338A, 338B illustrated in FIG. 3, each of the one or more electrothermal material foils 1238 may provide internal heating control, improving low-temperature or charging performance and ion transport in the instance of thick (e.g., greater than about 1000 μm) electrodes. As illustrated in FIG. 12, an electrothermal material foil 1238 may be disposed between each cell unit. Though not illustrated the skilled artisan will appreciate that in various instances the electrothermal material foil 1238 may be disposed elsewhere within example batteries. For example, in certain configurations, electrothermal material foils may be disposed between terminal ends of the battery pack, such as illustrated in FIG. 3. In other configurations, electrothermal material foils may be disposed between every other cell unit. In still other configurations, electrothermal material foils may be disposed between one or more internal cells of the battery pack, such as illustrated in FIG. 8. In each instance, the one or more electrothermal material foils 1238 may have a thickness greater than or equal to about 5 μm to less than or equal to about 200 μm, and in certain aspects, optionally greater than or equal to about 10 μm to less than or equal to about 100 μm.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A solid-state battery configured to cycle lithium ions, the solid-state battery comprising:
    one or more current collectors, wherein at least one of the one or more current collectors is in communication with one or more switches configured to move between an open position and a closed position, the open position corresponding to a first operational state of the solid-state battery and the closed position corresponding to a second operational state of the solid-state battery;
    one or more electrodes disposed adjacent to the one or more current collectors, each electrode having a thickness greater than or equal to about 100 micrometers to less than or equal to about 3,000 micrometers and comprising a plurality of solid-state electroactive material particles;
    and one or more electrothermal material foils comprising a resistor material and in electrical communication with the at least one of the one or more current collectors, wherein in the first operational state electrons flow through the one or more electrothermal material foils during cycling of the solid-state battery so as to initiate a heating mode, and in the second operational state electrons flow through the at least one of the one or more current collectors during cycling of the solid-state battery so as to initiate a non-heating mode;
    wherein, in the closed position, the at least one of the one or more current collectors is in electrical communication with an external circuit and, in both the opened and closed positions, at least one of the one or more electrothermal material foils are in electrical communication with the external circuit.

2. The solid-state battery of claim 1, wherein each of the one or more electrothermal material foils has a thickness greater than or equal to about 5 micrometers to less than or equal to about 200 micrometers, and
    wherein the resistor material is selected from the group consisting of: nickel, stainless steel, copper, constantan, chromium, aluminum, iron, titanium, graphite, and alloys and combinations thereof.

3. The solid-state battery of claim 1, wherein at least one of the one or more electrothermal material foils is patterned, the pattern comprising a plurality of void areas.

4. The solid-state battery of claim 1, wherein the plurality of solid-state electroactive material particles are disposed on or embedded in a porous material having a porosity greater than or equal to about 80 vol. % to less than or equal to about 95 vol. %, an average pore size greater than or equal to about 2 micrometers to less than or equal to about 1,000 micrometers, and a thickness greater than or equal to about 100 micrometers to less than or equal to about 4,000 micrometers.

5. The solid-state battery of claim 4, wherein the porous material is a metal foam selected from an aluminum (Al) foam, a nickel (Ni) foam, a copper (Cu) foam, a nickel-chromium (Ni—Cr) foam, a nickel-tin (Ni—Sn) foam, and a titanium (Ti) foam.

6. The solid-state battery of claim 4, wherein the porous material is one of a carbon nanofiber three-dimensional foam, a graphene foam, a carbon cloth, a carbon fiber-embedded carbon nanotubes, and a graphene-nickel foam.

7. The solid-state battery of claim 4, wherein the one or more electrodes comprise a first electrode and a second electrode, the first electrode comprising a first plurality of solid-state electroactive material particles and the second electrode comprising a second plurality of solid-state electroactive material particles,
wherein the at least one of one or more current collectors is a first current collector, and the first plurality of solid-state electroactive material particles is disposed adjacent to a first surface of the first current collector and the second plurality of solid-state electroactive material particles is disposed adjacent to a second surface of the first current collector that opposes the first surface.

8. The solid-state battery of claim 7, wherein the first current collector comprises a first film and a second film parallel with the first film, the first film defining the first surface of the first current collector and the second film defining the second surface of the first current collector.

9. The solid-state battery of claim 8, wherein the first film has a thickness less than or equal to about 10 micrometers and the second film has a thickness less than or equal to about 10 micrometers.

10. The solid-state battery of claim 7, wherein the first electrode further comprises a plurality of solid-state electrolyte particles that are mixed with the first plurality of solid-state electroactive material particles and the plurality of solid-state electrolyte particles is also disposed on the porous material.

11. The solid-state battery of claim 7, wherein the first plurality of solid-state electroactive material particles is disposed on a first section of the porous material, and
wherein the second plurality of solid-state electroactive material particles is disposed on a second section of the porous material.

12. The solid-state battery of claim 11, wherein the plurality of solid-state electrolyte particles mixed with the first plurality of solid-state electroactive material particles is a first plurality of solid-state electrolyte particles, and
wherein the second electrode further comprises a second plurality of solid-state electrolyte particles that is mixed with the second plurality of solid-state electroactive material particles and the second plurality of solid-state electrolyte particles is also disposed on the porous material.

13. The solid-state battery of claim 11, wherein the first current collector is a film disposed on a third portion of the porous material formed between the first and second portions of the porous material.

14. The solid-state battery of claim 4, wherein the at least one of the one or more current collectors is a first current collector and the one or more current collectors comprises a second current collector that is parallel with the first current collector;
wherein the one or more electrodes comprise a first electrode comprising a first plurality of solid-state electroactive material particles disposed adjacent to the first current collector, and a second electrode comprising a second plurality of solid-state electroactive material particles disposed adjacent to the second current collector; and
wherein the solid-state battery further comprises a solid-state electrolyte layer comprising a plurality of solid-state electrolyte particles disposed between the first electrode and the second electrode.

15. The solid-state battery of claim 14, wherein the solid-state electrolyte layer has a thickness greater than or equal to about 5 micrometers to less than or equal to about 100 micrometers and comprises:
a first sublayer comprising a first plurality of solid-state electrolyte particles, and
a second sublayer comprising a second plurality of solid-state electrolyte particles, wherein the first and second sublayers are the same or different.

16. A solid-state battery configured to cycle lithium ion, the solid-state battery comprising:
a first current collector;
a first electrode having a thickness greater than or equal to about 100 micrometers to less than or equal to about 3,000 micrometers disposed adjacent to the first current collector, the first electrode comprising a first plurality of solid-state electroactive material particles disposed on or embedded in a first porous material;
a second current collector parallel with the first current collector, wherein at least one of the first and second current collectors is in communication with one or more switches configured to move the solid-state battery between an open position and a closed position, wherein the open position corresponding to a first operational state of the solid-state battery and the closed position corresponding to a second operational state of the solid-state battery,
a second electrode having a thickness greater than or equal to about 100 micrometers to less than or equal to about 3,000 micrometers disposed adjacent to the second current collector, the second electrode comprising a second plurality of solid-state electroactive material particles disposed on or embedded in a second porous material;
a solid-state electrolyte layer disposed between the first electrode and the second electrode;
and one or more electrothermal material foils having a thickness greater than or equal to about 5 micrometers to less than or equal to about 200 micrometers and comprising a resistor material in electrical communication with at least one of the first and second current collectors, wherein in the first operational state electrons flow through the one or more electrothermal material foils during cycling of the solid-state battery so as to initiate a heating mode, and in the second operational state electrons flow through at least one of the first and second current collectors during cycling of the solid-state battery so as to initiate a non-heating mode,
wherein, in the closed position, at least one of the first current collector and the second current collector is in electrical communication with an external circuit and, in both the opened and closed positions, at least one of the one or more electrothermal material foils are in electrical communication with the external circuit.

17. The solid-state battery of claim 16, wherein the first and second porous materials each have a porosity greater than or equal to about 80 vol. % to less than or equal to about 95 vol. %, an average pore size of greater than or equal to about 2 micrometers to less than or equal to about 1,000 micrometers, and a thickness greater than or equal to about 100 micrometers to less than or equal to about 4,000 micrometers.

18. The solid-state battery of claim 16, wherein the resistor material is selected from the group consisting of: nickel, stainless steel, copper, constantan, chromium, aluminum, iron, titanium, graphite, and alloys and combinations thereof, and at least one of the one or more electrothermal material foils is patterned, the pattern comprising a plurality of void areas.

19. The solid-state battery of claim 16, wherein at least one of the first and second current collectors comprises a first film and a second film parallel with the first film, the first and second films having a thickness less than about 10 micrometers.

* * * * *